(12) United States Patent
Shimizu

(10) Patent No.: US 10,180,806 B2
(45) Date of Patent: Jan. 15, 2019

(54) INFORMATION PROCESSING APPARATUS, INFORMATION PROCESSING METHOD, AND RECORDING MEDIUM

(71) Applicant: Naoki Shimizu, Kanagawa (JP)

(72) Inventor: Naoki Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 162 days.

(21) Appl. No.: 15/267,527

(22) Filed: Sep. 16, 2016

(65) Prior Publication Data
US 2017/0102898 A1    Apr. 13, 2017

(30) Foreign Application Priority Data

Oct. 9, 2015   (JP) ................................. 2015-201249

(51) Int. Cl.
| | | |
|---|---|---|
| *H04L 29/06* | (2006.01) | |
| *G06F 3/06* | (2006.01) | |
| *G06F 17/30* | (2006.01) | |
| *G06F 21/00* | (2013.01) | |

(52) U.S. Cl.
CPC .......... *G06F 3/0643* (2013.01); *G06F 3/0604* (2013.01); *G06F 3/067* (2013.01); *G06F 17/30115* (2013.01); *G06F 17/30235* (2013.01); *G06F 21/00* (2013.01); *H04L 63/0428* (2013.01); *H04L 63/06* (2013.01)

(58) Field of Classification Search
CPC ...... G06F 3/0643; G06F 3/0604; G06F 3/067; G06F 17/30115; G06F 17/30235; G06F 21/00; H04L 63/0428; H04L 63/06

USPC ......................................................... 713/165
See application file for complete search history.

(56) References Cited

U.S. PATENT DOCUMENTS

| | | | | |
|---|---|---|---|---|
| 6,249,866 B1 * | 6/2001 | Brundrett | ............ | G06F 12/1408 380/286 |
| 8,099,605 B1 * | 1/2012 | Billsrom | ............. | G06F 11/1448 713/187 |
| 2003/0210790 A1 * | 11/2003 | Riedel | ................ | G06F 21/6218 380/277 |
| 2007/0116287 A1 * | 5/2007 | Rasizade | ................ | G06F 21/10 380/258 |

(Continued)

FOREIGN PATENT DOCUMENTS

| | | |
|---|---|---|
| JP | 2010-287104 | 12/2010 |
| JP | 2013-186538 | 9/2013 |

*Primary Examiner* — Michael S McNally
(74) *Attorney, Agent, or Firm* — Harness, Dickey & Pierce, P.L.C.

(57) ABSTRACT

An information processing apparatus is connected to a plurality of online storages through a network. The apparatus includes a circuitry to divide a file into a plurality of pieces of segment data, encrypt each of the plurality of segment data with an encryption key, and generate a plurality of final generated files, each including the encryption key and at least one piece of the plurality of segment data encrypted with the encryption key, and a transmitter to transmit each one of the plurality of final generated files to a corresponding one of the plurality of online storages. The circuitry manages folder and file management information that associates a folder path of each of the folders stored in the online storages with a virtual folder path, and associates a file path of each of the final generated files stored in the online storages with a virtual file path.

10 Claims, 18 Drawing Sheets

(56) References Cited

U.S. PATENT DOCUMENTS

| | | | |
|---|---|---|---|
| 2007/0245108 A1* | 10/2007 | Yasaki | G06F 12/0844 |
| | | | 711/163 |
| 2013/0136256 A1* | 5/2013 | Relyea | H04L 9/0637 |
| | | | 380/28 |
| 2013/0238689 A1 | 9/2013 | Matsushima et al. | |
| 2013/0254326 A1* | 9/2013 | Weng | H04L 67/1097 |
| | | | 709/215 |

* cited by examiner

FIG. 10
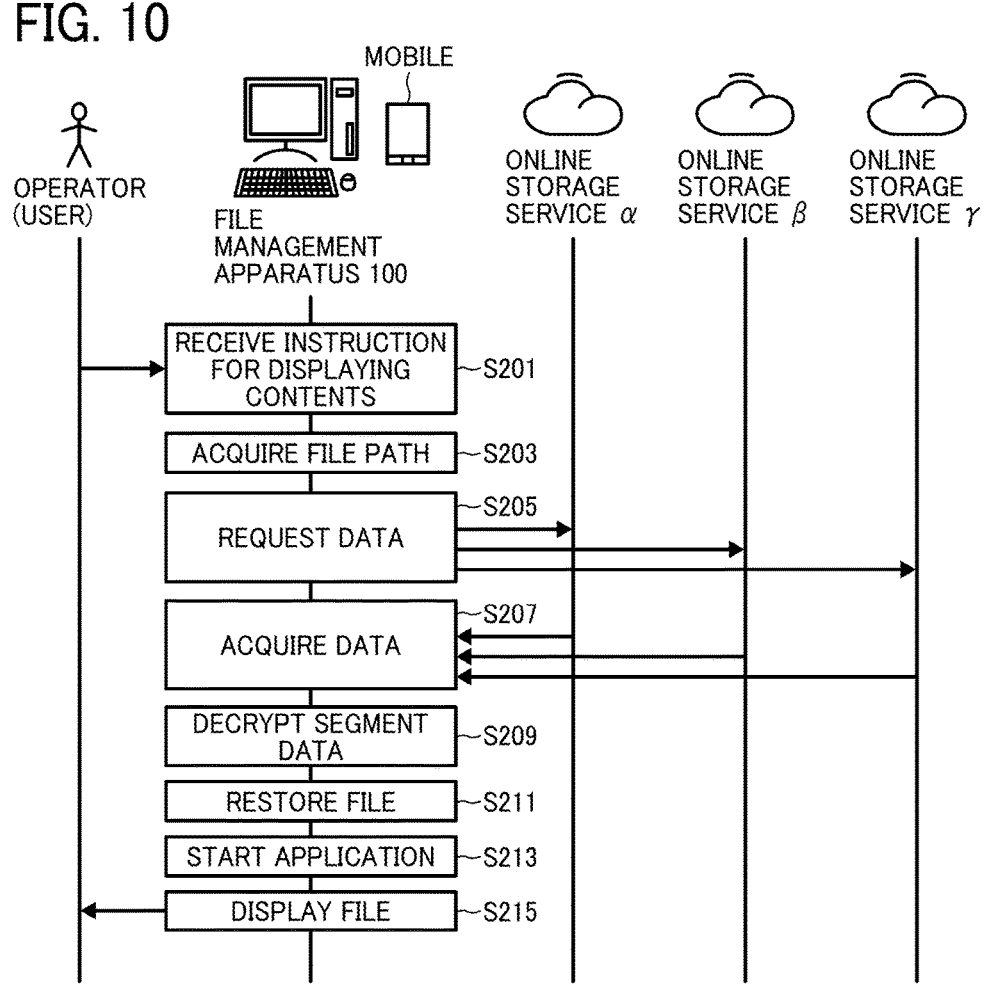
FIG. 11 VIRTUAL FOLDER AND FILE VIEW
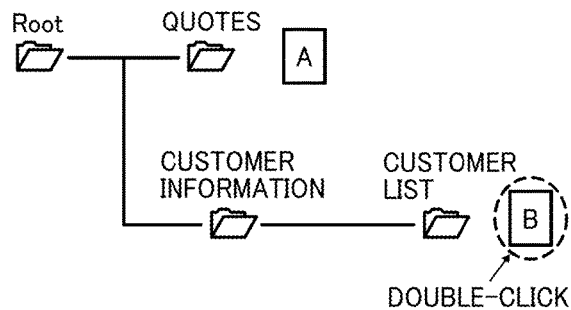

FIG. 15
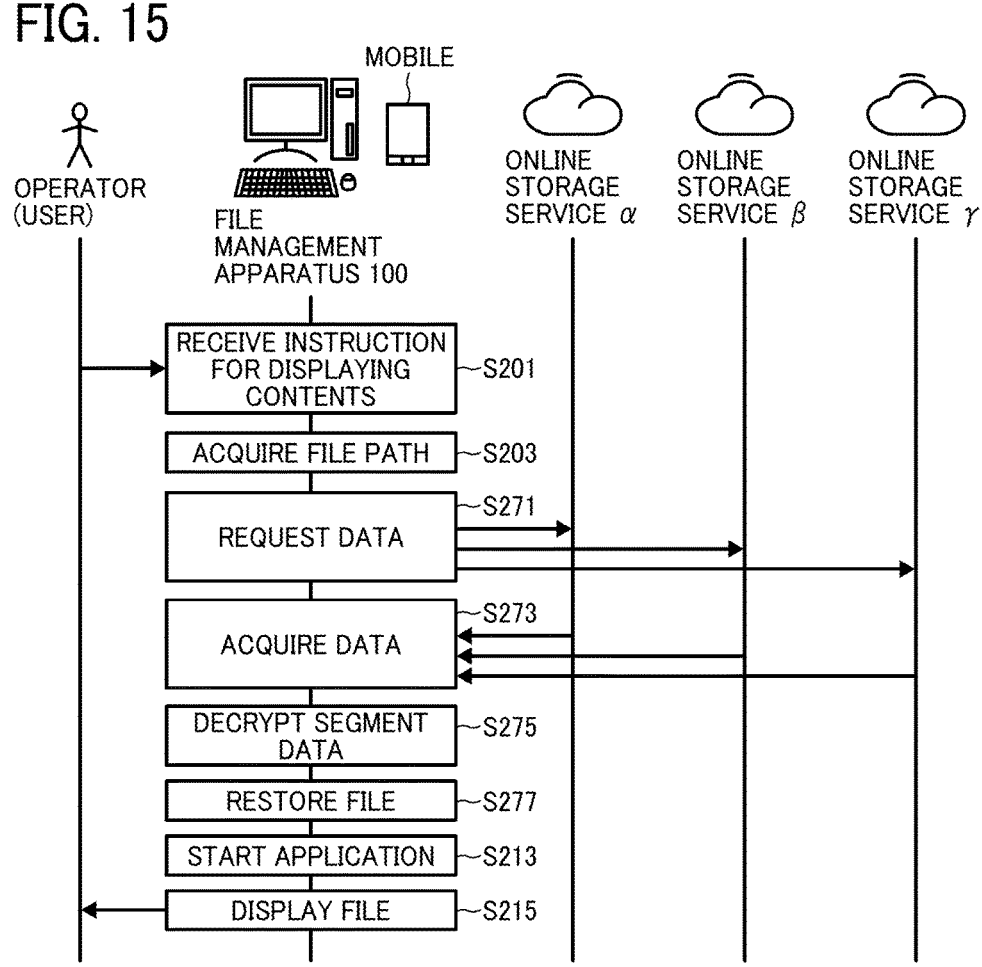
FIG. 16  VIRTUAL FOLDER AND FILE VIEW
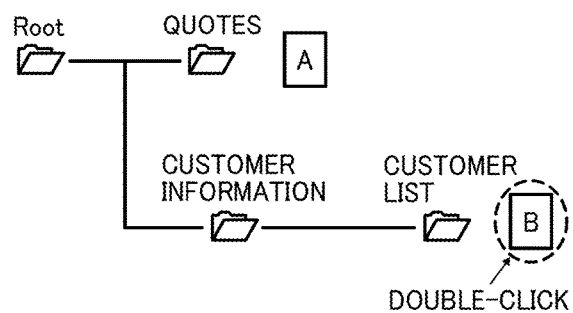

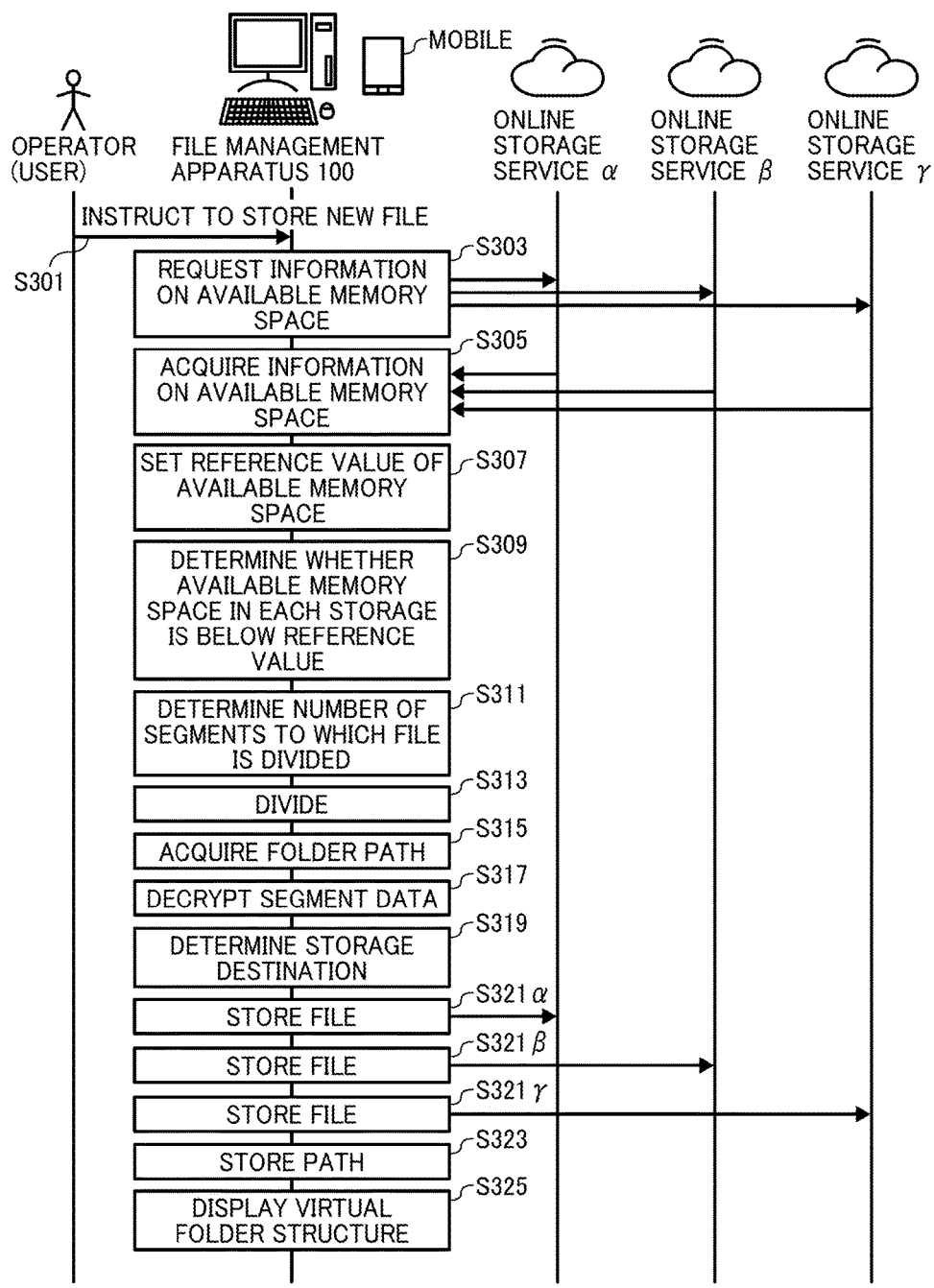

INFORMATION PROCESSING APPARATUS, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2015-201249, filed on Oct. 9, 2015 in the Japan Patent Office, the entire disclosure of which is hereby incorporated by reference herein.

BACKGROUND

Technical Field

The present disclosure relates to an information processing apparatus, an information processing method, and a non-transitory recording medium.

Description of the Related Art

In recent years, various companies provide online storage services to offer a disc space for storing files or data over the Internet. Some companies provide the online storage service for free, however they often place a limit on a disc capacity a user can consume for free. For this reason, the user sometimes subscribes different online storage services offered by different companies, and allocate files or data to different storages such that an amount of files or data allocated to each storage does not exceed the limit.

SUMMARY

An information processing apparatus is connected to a plurality of online storages through a network. The apparatus includes circuitry and a transmitter. The circuitry divides a file into a plurality of pieces of segment data, encrypts each of the plurality of segment data with an encryption key, and generates a plurality of final generated files, each including the encryption key and at least one piece of the plurality of segment data encrypted with the encryption key. The transmitter transmits each one of the plurality of final generated files to a corresponding one of the plurality of online storages to cause each final generated file be stored in a folder in the corresponding online storage area. The circuitry manages folder and file management information. The folder and file management information associates a folder path of each of the folders stored in the online storages with a virtual folder path, and associates a file path of each of the final generated files stored in the online storages with a virtual file path. The virtual file path and the virtual folder path are set for managing the folder and the file.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 10 is a sequence diagram illustrating an example operation of opening a file using the virtual folder/file view according to an embodiment of the present invention;

FIG. 11 illustrates an example of the virtual folder view according to an embodiment of the present invention;

FIG. 15 is a sequence diagram illustrating an example operation of opening a file using the virtual folder/file view according to another embodiment of the present invention;

FIG. 16 illustrates an example of the virtual folder view according to another embodiment of the present invention;

FIG. 17 is a sequence diagram illustrating an example operation of storing a new file according to still another embodiment of the present invention;

Figure 1:
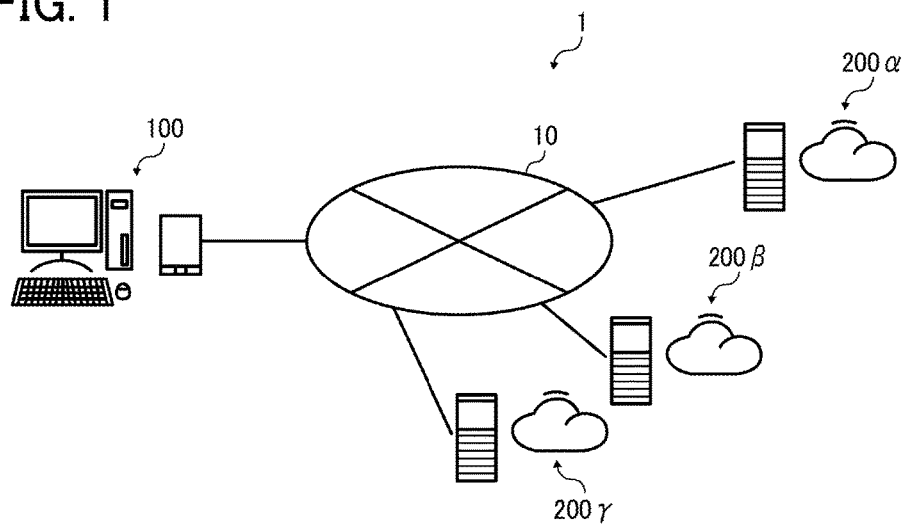
FIG. 1 is a schematic diagram illustrating a configuration of a file management system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Although a term "folder" is used in the following description, a "directory" may be alternatively used.

Several example embodiments of the present invention will be described hereinafter with reference to drawings.

First, a description is given of an overview of a file management system 1 as an information processing system including a file management apparatus 100 as an information processing apparatus. FIG. 1 is a schematic view illustrating a configuration of the file management system 1.

As illustrated in FIG. 1, the file management system 1 includes the file management apparatus 100 and a plurality of servers such as a server 200α, a server 200β, and a server 200γ, which are connected to one another via a communication network 10. The server 200α, the server 200β, and the server 200γ, respectively, provide online storage service α (an online storage α), online storage service β (an online storage β), and online storage service γ (an online storage γ). Each storage may be implemented by a storage area.

The file management apparatus 100 is implemented by an information processing apparatus (computer apparatus) such as a personal computer and a smartphone. An application (program) for managing files is installed on the information processing apparatus. The information processing apparatus executes the installed application to operate as the file management apparatus 100 that performs processing for managing files described below.

The server 200α, the server 200β, and the server 200γ are each implemented by a typical computer, and stores data transmitted from the file management apparatus 100 therein. The online storage service α, the online storage service β, and the online storage γ are each a typical online storage service. The server 200α, the server 200β, and the server 200γ each places an upper limit on an amount of storage that a user can consume.

The file management apparatus 100 according to an embodiment of the present invention divides a file into a plurality of pieces of segment data and allocates the plurality of segment data respectively to the server 200α, the server 200β, and the server 200γ. Further, the file management apparatus 100 manages the plurality of segment data constituting the file stored in each of the servers throughout the server 200α, the server 200β, and the server 200γ on a folder by folder basis.

Hereinafter, a description is given of a hardware configuration of the file management apparatus 100 with reference to FIG. 2.

Figure 2:
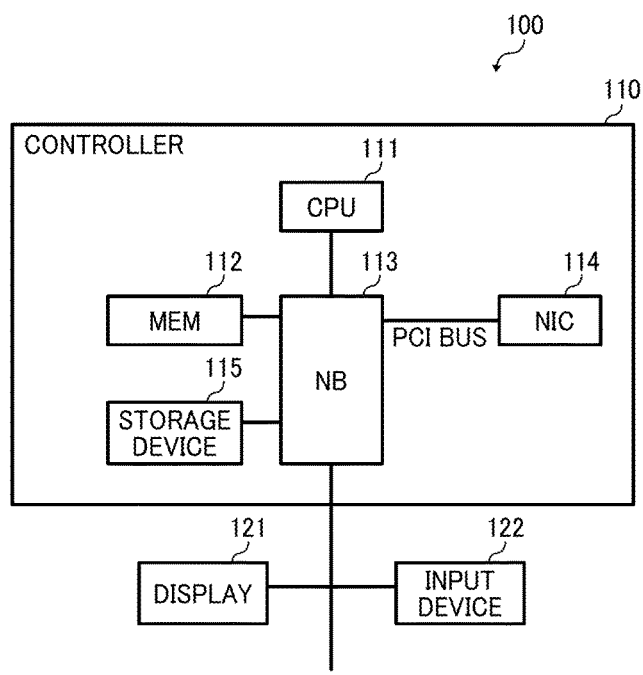
FIG. 2 is a block diagram illustrating a hardware configuration of a file management apparatus according to an embodiment of the present invention.

As illustrated in FIG. 2, the file management apparatus 100 includes a controller 110, a display 121, and an input device 122.

The controller 110 includes a central processing unit (CPU) 111, a local memory (MEM) 112, a north bridge (NB) 113, a network interface controller (NIC) 114, and a storage device 115.

The CPU 111 is an integrated circuit to process various data to control an entire operation of the file management apparatus 100. The NB 113 is a bridge to connect the CPU 111, the MEM 112, the NIC 114, and the storage device 115 to one another. The MEM 112 is a local memory used as a work area or a buffer by the CPU 111 when executing various processing. The NIC 114 is a controller for network communication using a media access control (MAC) address. The NIC 114 is connected to the NB 113 via a PCI bus. The storage device 115 is implemented by a nonvolatile memory such as a hard disc drive (HDD) and a solid state drive (SSD). The storage device 115 is a local storage to store an application program for managing files and various data dealt by the application program for managing files. The application program for managing files may be referred to as simply a "file management application" or a "file management program" hereinafter.

The display 121 displays to the user various information provided by the file management apparatus 100.

The input device 112 receives various instructions to the file management system 1 from an operator (user). The input device 112 is implemented by, for example, a keyboard or a mouse. Alternatively, the input device 112 is implemented by a touch panel that is mounted on any desired display such as the display 121. The server 200α, the server 200β, and the server 200γ illustrated in FIG. 1 each has the same or substantially the same hardware configuration as that of the file management apparatus 100.

Hereinafter, a description is given of a functional configuration of the file management apparatus 100 according to an embodiment of the present invention with reference to FIG. 3.

When a user activates the file management application or the file management program on a typical information processing apparatus such as a personal computer or a smartphone, the information processing apparatus operates as the file management apparatus 100 having functional blocks described below.

Figure 3:
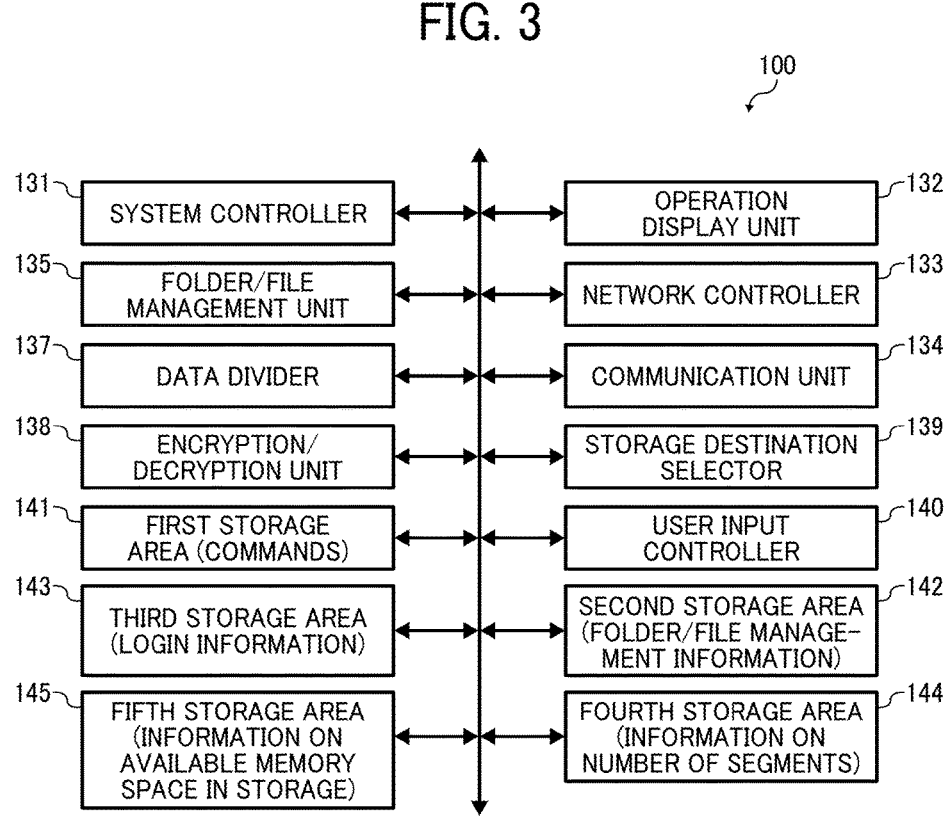
FIG. 3 is a block diagram illustrating a functional configuration of the file management apparatus according to an embodiment of the present invention.

As illustrated in FIG. 3, the file management apparatus 100 includes a system controller 131, an operation display unit 132, a network controller 133, a communication unit 134, a folder/file management unit 135, a data divider 137, an encryption/decryption unit 138, a storage destination selector 139, a user input controller 140, a first storage area 141, a second storage area 142, a third storage area 143, a fourth storage area 144, and a fifth storage area 145.

The system controller 131 is a microcomputer to control an entire operation of the file management apparatus 100. The system controller 131 is implement by the CPU 111 and the MEM 112 illustrated in FIG. 2.

The operation display unit 132, which is implemented by the display 121, displays various information to the operator The network controller 133, which is implemented by the NIC 114, transmits and receives packet data to and from the communication network 10.

The communication unit 134 transmits and receives data in the MEM 112 via the network controller 133 to acquire or update information of the folders and the files in the online storages α to γ. In addition, the communication unit 134 performs an authentication processing for logging in the online storage services α to γ. The communication unit 134, which is implemented by the NIC 114 and the MEM 112, is configured by a web API.

The folder/file management unit 135 associates virtual folder paths and virtual file paths to be presented to the user at the file management apparatus 100 respectively with folder paths and file paths on a local storage or the online storages α to γ. Actual files are stored in the folder in each of the online storages α to γ or the local storage. The folder/file management unit 135 manages information associating the virtual folder paths and the virtual file paths respectively with the folder paths and file paths on the local storage or the online storages α to γ as folder/file management information. The folder/file management unit 135 is implemented by the CPU 111 and the MEM 112.

The data divider 137 divides file data or page data constituting the file into a predetermined number of segment data. The plurality of segment data have the same or substantially the same data size. The data divider 137 is implemented by the CPU 111 and the MEM 112. Alternatively, the data divider 137 may be implement by the CPU 111, the MEM 112, and the storage device 115 as a virtual memory, depending on a capacity of the MEM 112.

The encryption/decryption unit 138 encrypts each of the plurality of segment data using an encryption key and decrypts the encrypted data using the encryption key. The encryption/decryption unit 138 is implemented by the CPU 111 and the MEM 112.

The storage destination selector 139 selects the online storage in which each of the plurality of segment data is to be stored from among the online storages α to γ. The storage destination selector 139 is implemented by the CPU 111 and the MEM 112.

The user input controller 140, which is implemented by the input device 122, receives an input of various information from the operator.

The first storage area 141, which is implemented by the storage device 115, stores commands for executing file operations. The commands stored in the first storage area 141 is transmitted to at least one of the servers 200α to 200γ that respectively provide the online storage services α to γ.

The second storage area 142, which is implemented by the storage device 115, stores the information associating the virtual folder/file path presented to the user with the folder/file path in the local storage or the online storages α to γ.

The third storage area 143, which is implemented by the storage device 115, stores login information such as a user ID and a password for authentication of the user when logging in each of the online storages α to γ.

The fourth storage area 144, which is implemented by the storage device 115, stores information as to the number of segments into which each file data or each page data is to be divided. The fourth storage area 144 stores a fixed number of segments into which each file data or each page data is to be divided. Alternatively, the fourth storage area 144 stores a number that is set by the user.

The fifth storage area 145 stores a reference value for determining whether an available memory space in each of the online storages α to γ is small. The reference value stored in the fifth storage area 145 may be a fixed value. Alternatively, the reference value stored in the fifth storage area 145 may be set by the user.

Hereinafter, a description is given of operations performed by the file management apparatus 100 as the information processing apparatus according to an embodiment of the present invention.

Figure 4:
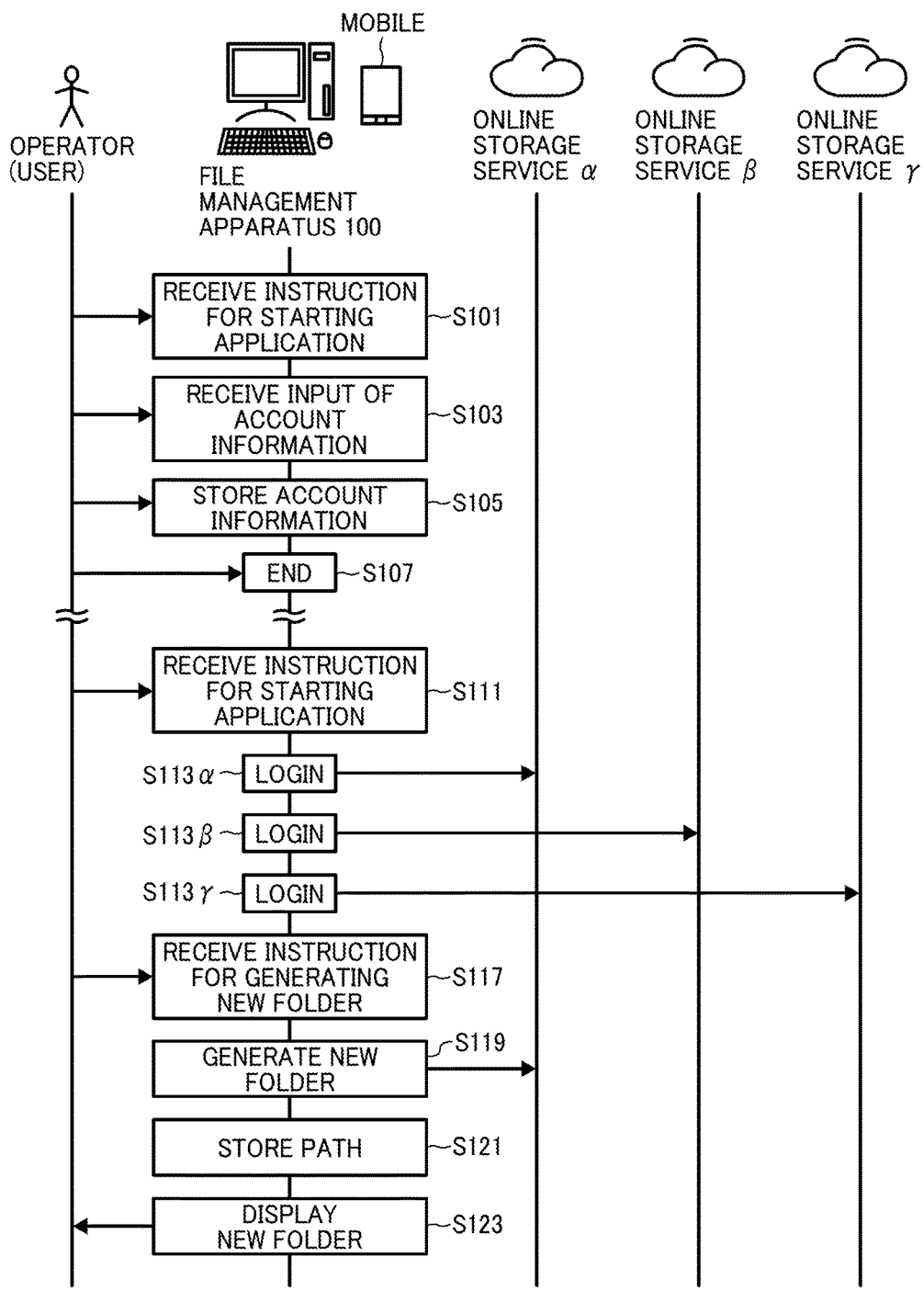
FIG. 4 is a sequence diagram illustrating an example operation of configuring initial setting of the file management apparatus and generating a new folder according to an embodiment of the present invention.

FIG. 4 is a sequence diagram illustrating an example operation of configuring initial setting of the file management apparatus 100 and generating a new folder.

At S101, the file management apparatus 100 receives, from a user, an instruction for activating the file management application installed on the file management apparatus. The system controller 131 activates the file management application in response to the instruction from the user. A computer installed with the file management application executes the file management application to function as the file management apparatus 100.

At S103, the user enters account information such as the login ID and the password for logging in each of the online storages α to γ to the file management apparatus 100.

At S105, the system controller 131 stores the account information that is input through the user input controller 140 in the third storage area 143.

At S107, the file management apparatus 100 receives, from the user, an instruction for exiting the file management application. The system controller 131 ends the file management application in response to the instruction from the user.

Figure 5:
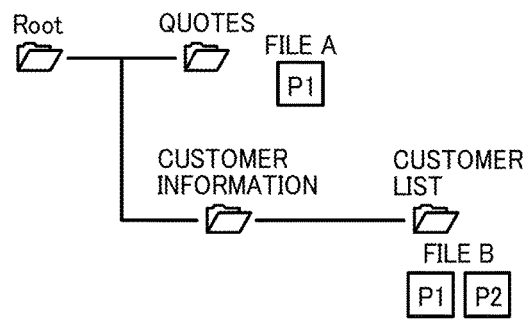
FIG. 5 illustrates an example of a virtual folder view according to an embodiment of the present invention.

Hereinafter, a description is given an example operation of generating a new folder named "Quotes" with reference to FIGS. 4 and 5. FIG. 5 illustrates an example of a virtual folder view.

At S111, the file management apparatus 100 receives, from the user, an instruction for activating the file management application installed on the file management apparatus 200 as the information processing apparatus. The system controller 131 activates the file management application in response to the instruction from the user. A computer installed with the file management application executes the file management application to function as the file management apparatus 100.

At S113, the communication unit 134 of the file management apparatus 100 logs in each of the online storage services α to γ using the account information stored in the third storage area 143. This login process is performed on all of the online storages registered at the file management apparatus 100 (S113α, S113β, S113γ . . . ). When the user is authenticated to log in each of the online storages α to γ, the system controller 131 instructs the operation display unit 132 to display the virtual folder view illustrated in FIG. 5 on the display 121.

At S117, the user input controller 140 receives the user instruction for generating the new folder named "Quotes". The user inputs this instruction on the virtual folder view displayed on the display 121 using the input device 122.

At S119, in response to receiving the instruction for generating the new folder named "Quotes" via the user input controller 140, the folder/file management unit 135 generates the "Quotes" folder in the online storage α. More specifically, the commands for implementing file operations are read out from the first storage area 141 and transmitted to the online storage α via the communication unit 134.

At S121, the folder/file management unit 135 acquires a folder path of a folder in the online storage α via the communication unit 134 to generate the folder/file management information that associates a folder path of the virtual folder with the acquired folder path of the folder in the online storage α. Further, the folder/file management unit 135 stores the generated folder/file management information in the second storage area 142.

At S123, the operation display unit 132 displays the folder named "Quotes" in the virtual folder view on the display 121 as illustrated in FIG. 5.

Figure 6:
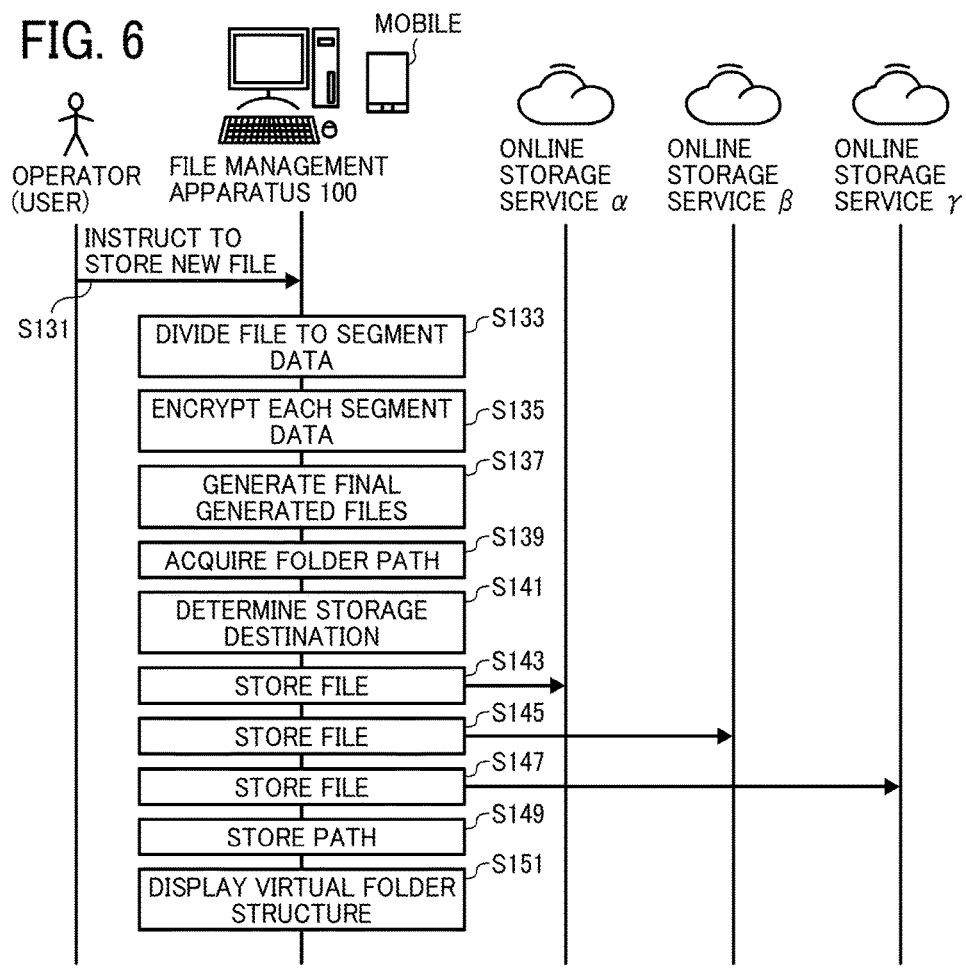
FIG. 6 is a sequence diagram illustrating an example operation of storing a new file after the generation of the new folder according to an embodiment of the present invention.
Figure 7A:
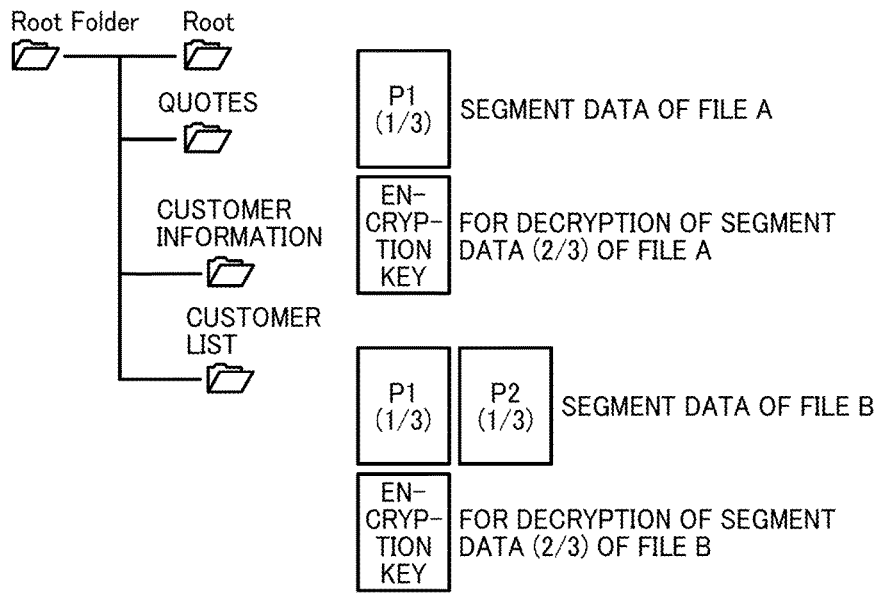
FIGS. 7A to 7C each illustrates an example of a folder structure of an online storage service according to an embodiment of the present invention.
Figure 7B:
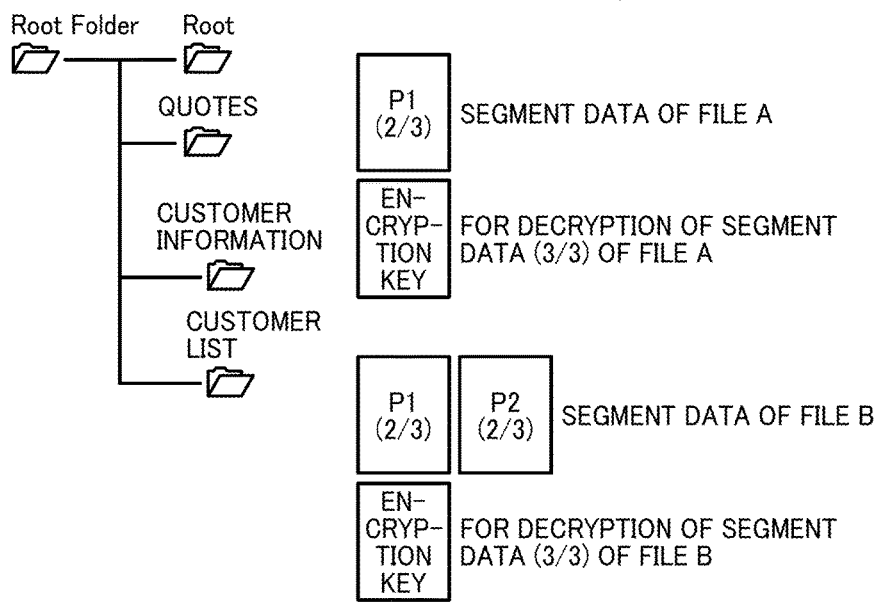
Figure 7C:
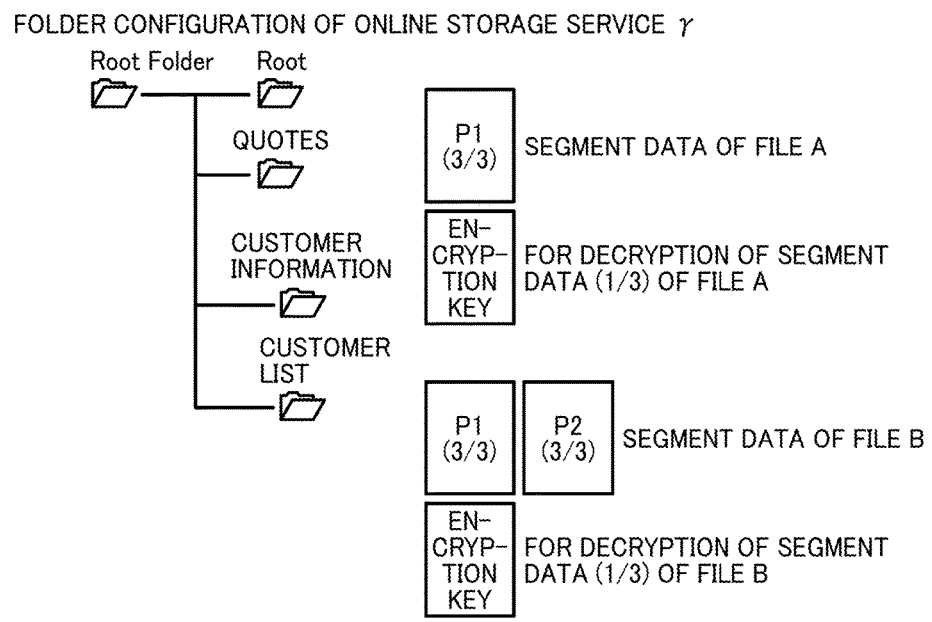

Hereinafter, a description is given of an example operation of storing a new file after the initial setting with reference to FIGS. 6 and 7. FIG. 6 is a sequence diagram illustrating an example operation of storing a new file after the generation of the new folder. FIGS. 7A to 7C respectively illustrate examples of a folder structure of the online storage services α to γ.

At S131, the file management apparatus 100 receives, from the user, an instruction for storing a new file "File B" in a folder "Customer List" displayed on the virtual folder view (FIG. 5) displayed on the operation display unit 132.

At S133, the data divider 137 determines the number of segment data into which the file data is to be divided. Specifically, the data divider 137 divides the file data into the plurality of segment data such that the number of segment data divided from each page is equal to the number of the online storage services that the user uses. In this embodiment, as the user uses three online storage services α to γ, the data divider 137 divides the file data (page data) into three pieces of segment data. More specifically, as the File B is consisted of two pages (P1, P2), the data divider 137 divides each page to three pieces of segment data as illustrated in Table 1 below. As illustrated in Table 1, P1 is divided into first to third segment data, which are respectively represented by P1 (1/3), P1 (2/3), and P1 (3/3). In addition, P2 is divided into first to third segment data, which are respectively represented by P2 (1/3), P2 (2/3), and P2 (3/3).

TABLE 1

| Before Division | After Division | | |
| --- | --- | --- | --- |
| P1 | P1 (1/3) | P1 (2/3) | P1 (3/3) |
| P2 | P2 (1/3) | P2 (2/3) | P2 (3/3) |

The encryption/decryption unit 138 acquires the number of pieces of segment data into which each page data is divided. Further, the encryption/decryption unit 138 generates a plurality of encryption keys such that the number of the encryption keys is equal to the acquired number of pieces of segment data. In this embodiment, although the number of pieces of segment data is six in total, the encryption/decryption unit 138 generates three encryption keys, each key being used for encrypting one segment data of P1 and one segment data of P2. At S135, the encryption/decryption unit 138 encrypts each segment data using each encryption key. A private key cryptography is used for the encryption.

Alternatively, the number of encryption keys generated by the encryption/decryption unit 138 may be equal to the total number of pieces of segment data.

Thus, the file management apparatus 100 stores a plurality of final generated files in different online storages with the number of the final generated files being equal to the number of the online storages. Accordingly, the file management apparatus 100 manages the folder/management information associating the folder path and the file path of each of the plurality of final generated file with the virtual folder path and the virtual file path that are set for managing each folder and file. Thus, the user is able to locate the file by intuition even when the user uses the online storage directly not through the file management apparatus 100.

At S137, the folder/file management unit 135 generates a plurality of final generated files, each containing at least one segment data and a file describing the encryption key for decrypting the segment data. Table 2 indicates the files describing the encryption key for decrypting the segment data of each page.

TABLE 2

A file describing the encryption key for decrypting the segment data P (1/3) and P2 (1/3)
A file describing the encryption key for decrypting the segment data P (2/3) and P2 (2/3)
A file describing the encryption key for decrypting the segment data P (3/3) and P2 (3/3)

At S139, the folder/file management unit 135 checks the folder/file management information stored in the second storage area 142 to acquire a folder path on each of the online storage services α to γ associated with the virtual folder "Customer List". Table 3 indicates the folder path of the folder "Customer List" in each of the online storage services α to γ.

TABLE 3

| online storage service α | online storage service α/Customer List |
| online storage service β | online storage service β/Customer List |
| online storage service γ | online storage service γ/Customer List |

At S141, the storage destination selector 139 determines the folder in the online storages α to γ in which each of six pieces of segment data and three encryption keys is to be stored. Specifically, the storage destination selector 139 determines the folder in which each segment data is to be stored such that each of the plurality of segment data of each page is allocated to a corresponding one of the online storages α to γ in the order from α to γ.

According to the determination by the storage destination selector 139, at S143, the folder/file management unit 135 transmits the first segment data of each page to the online storage service α. Further, at S145, the folder/file management unit 135 transmits the second segment data of each page to the online storage service β. Furthermore, at S147, the folder/file management unit 135 transmits the third segment data of each page to the online storage service γ. The online storage service α to γ each stores the transmitted segment data. Further, as illustrated in FIGS. 7A to 7C, the encryption keys are allocated to the online storages α to γ such that the segment data and the encryption key that are allocated to the same online storage do not correspond to each other. Specifically, the folder/file management unit 135, under control of the system controller 131, stores the six pieces of segment data and the three encryption keys in a predetermined folder (e.g., the "Customer List" folder in this embodiment) in each of the online storage service α to γ based on the folder/file management information stored in the second storage area 142.

At S149, the folder/file management unit 135, under control of the system controller 131, adds information associating the file path of File B with the file path of the segment data of File B stored in each of the online storages α to γ to the second storage area 142. The folder/file management unit 135 also stores an order of the plurality of segment data (Table 4). Table 4 indicates the file paths of the segment data stored by the online storage services α to γ.

TABLE 4 online storage service α/Customer List/B P1 (1/3)
online storage service β/Customer List/B P1 (2/3)
online storage service γ/Customer List/B P1 (3/3)
online storage service α/Customer List/B P2 (1/3)
online storage service β/Customer List/B P2 (2/3)
online storage service γ/Customer List/B P2 (3/3)

Figure 9:
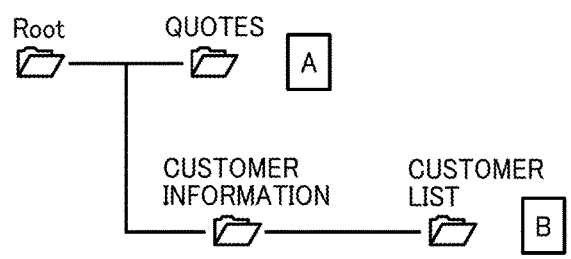
FIG. 9 illustrates an example of the virtual folder view according to an embodiment of the present invention.

At S151, the system controller 131 acquires a virtual folder structure and the location of files including the result of storing the File B via the folder/file management unit 135 to instruct the operation display unit 132 to display the acquired contents on the display 121 as illustrated in FIG. 9.

Figure 8:
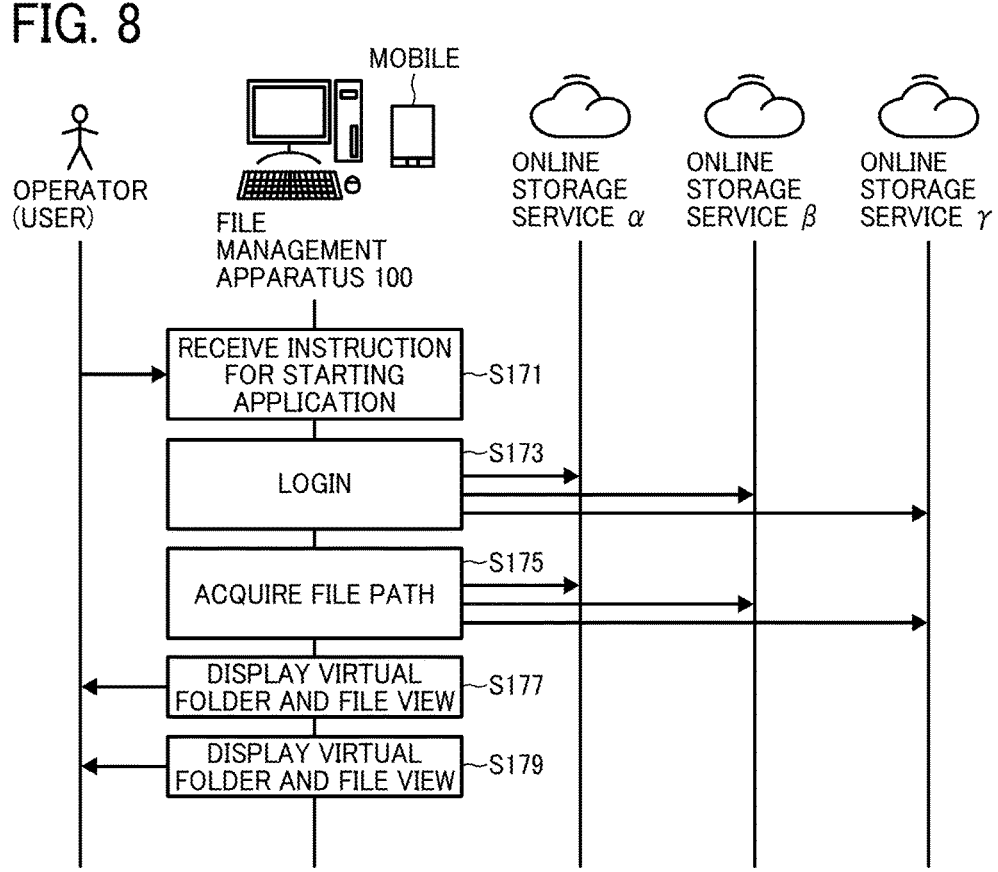
FIG. 8 is a sequence diagram illustrating an example operation of displaying a virtual folder structure according to an embodiment of the present invention.

Hereinafter, a description is given of an example operation of displaying the virtual folder structure with reference to FIGS. 8 and 9. FIG. 8 is a sequence diagram illustrating an example operation of displaying the virtual folder structure. FIG. 9 illustrates an example of the virtual folder view.

At S171, the system controller 131 activates the file management application in response to the user instruction input through the input device 122. For example, the user clicks an icon of the file management application on the display 121 to instruct the activation of the file management application.

At S173, the folder/file management unit 135 acquires the account information from the third storage area 143 to log in the online storage services α to γ via the communication unit 134.

At S175, the folder/file management unit 135 acquires the path information of folders and files from each of the online storage services α to γ via the communication unit 134.

The folder/file management unit 135 compares the path information of the folders and the files acquired from each of the online storage services α to γ with the file path information stored in the second storage area 142 to determine whether the folder and the file constituting the virtual folder/file structure are present in each of the online storages α to γ.

Specifically, the folder/file management unit 135 accesses the online storage services α to γ to check whether folders and files corresponding to all of the folder paths and file paths stored in the second storage area 142 are present in the online storages α to γ.

When the determination result at S175 indicates that the folders and the files corresponding to all of the folder paths and file paths stored in the second storage area 142 are present in the online storages α to γ, at S177, the folder/file management unit 135 instructs the operation display unit 132 to display the virtual folder/file view on the display 121 as illustrated in FIG. 9. Table 5 illustrates the relation between the virtual path and an actual data path.

By contrast, when the determination result at S175 indicates that the second storage area 142 stores one or more folder paths or file paths that do not correspond to any one of the folders or files in the online storages α to γ, the folder/file management unit 135 instructs the operation display unit 132 to display a warning and the virtual folder/file view that includes the folders and files other than the files or paths determined not to be present in the online storages α to γ on the display 121.

to be stored in the corresponding online storage. Accordingly, the file management apparatus 100 manages the folder/management information associating the folder path and the file path of each of the plurality of final generated files respectively with the virtual folder path and the virtual file path that are set for managing the folder and the file. Thus, the user is able to locate the file by intuition even when the user uses the online storage directly not through the file management apparatus 100.

Hereinafter, a description is given of an example operation of opening a file using the virtual folder/file view with reference to FIGS. 10 and 11. FIG. 11 illustrates an example of the virtual folder view. FIG. 10 is a sequence diagram illustrating an example operation of opening a file using the virtual folder/file view.

At S201, in response to detecting the user selection of File B in the virtual folder view on the display 121, for example, through double-clicking the icon of File B as illustrated in FIG. 11, the user input controller 140 instructs the system controller 131 to display a content of File B.

At S203, the system controller 131 acquires the file paths of file data (all segment data) associated with File B in the online storages α to γ via the folder/file management unit 135 based on the folder/file management information stored in the second storage area 142. Table 6 indicates the file paths of the segment data stored in the online storages α to γ.

TABLE 6

| |
| --- |
| online storage service α/Customer List/B P1 (1/3) |
| online storage service β/Customer List/B P1 (2/3) |
| online storage service γ/Customer List/B P1 (3/3) |
| online storage service α/Customer List/B P2 (1/3) |
| online storage service β/Customer List/B P2 (2/3) |
| online storage service γ/Customer List/B P2 (3/3) |

TABLE 5

| Virtual path | Actual data path |
| --- | --- |
| Root/Quotes | online storage service α/Quotes |
| Root/Quotes | online storage service β/Quotes |
| Root/Quotes | online storage service γ/Quotes |
| Root/Customer Information/Customer List | online storage service α/Customer List |
| Root/Customer Information/Customer List | online storage service β/Customer List |
| Root/Customer Information/Customer List | online storage service γ/Customer List |
| Root/Quotes/A | online storage service α/Quotes/A P (1/3) |
| Root/Quotes/A | online storage service β/Quotes/A P (2/3) |
| Root/Quotes/A | online storage service γ/Quotes/A P (3/3) |
| Root/Customer Information/Customer List/B | online storage service α/Customer List/B P1 (1/3) |
| Root/Customer Information/Customer List/B | online storage service β/Customer List/B P1 (2/3) |
| Root/Customer Information/Customer List/B | online storage service γ/Customer List/B P1 (3/3) |
| Root/Customer Information/Customer List/B | online storage service α/Customer List/B P2 (1/3) |
| Root/Customer Information/Customer List/B | online storage service β/Customer List/B P2 (2/3) |
| Root/Customer Information/Customer List/B | online storage service γ/Customer List/B P2 (3/3) |

Thus, the file management apparatus 100 encrypts the plurality of segment data with different encryption keys, generates the plurality of final generated files, each containing one of the encryption keys and at least one of the plurality of segment data that is encrypted with the another one of the encryption keys, and transmits each of the plurality of final generated files to the corresponding one of the online storages α to γ to cause each final generated file The system controller 131 generates data requests (file path requests) requesting acquisition of all segment data divided from File B and the encryption keys based on the file paths acquired at S203. At S205, the communication unit 134 transmits the data requests generated by the system controller 131 to the online storage services α to γ.

In response to receiving the data requests from the file management apparatus 100, the online storage services α to γ read out the segment data divided from File B and the encryption key respectively from the online storages α to γ based on the file paths contained in the data requests. Further, each of the online storage services α to γ transmits the read-out segment data and encryption key to the file management apparatus 100.

At S207, the communication unit 134 receives all segment data divided from File B and encryption keys corresponding to the file paths acquired at S203 from the online storage services α to γ. Accordingly, the system controller 131 acquires all segment data and encryption keys onto the MEM 112.

At S209, the encryption/decryption unit 138 decrypts each segment data with the corresponding encryption key on the MEM 112 to reproduce each original segment data.

At S211, the encryption/decryption unit 138 combines the plurality of decrypted segment data to restore File B in a file format. Further the encryption/decryption unit 138 stores the restored File B in the folder in the storage device 115.

At S213, the system controller 131 activates an application corresponding to a format of File B and provides the application with a file path of File B stored in the folder in the storage device 115.

At S215, the system controller 131 instructs the operation display unit 132 as a user interface to display the content of File B on the display 121 using the application.

In the related art, a file management apparatus allocates a plurality of files to different online storages. In other words, the files are not organized by a folder. Accordingly, in the related art, the user has a difficulty in visually identifying where each file is located when using the online storage directly not through the file management apparatus. In other words, in the related art, the user has to use the online storage through the file management apparatus.

By contrast, according to the embodiment described heretofore, the online storages store the files on a folder by folder basis. Accordingly, the user is able to visually identify where each file is located.

Thus, the file management apparatus 100 manages the folder/file management information associating the folder path and the file path of each of the plurality of final generated files each containing the encrypted segment data stored in the online storages α to γ with the virtual folder path and the virtual file path that are set for managing each folder and file. Thus, the user is able to locate the file by intuition even when the user uses the online storage directly not through the file management apparatus 100.

Hereinafter, a description is given of operations performed by the file management apparatus 100 as the information processing apparatus according to another embodiment of the present invention.

In the embodiment described above with reference to FIGS. 1 to 11, the file management apparatus 100 allocates the plurality of segment data of each page to the online storages α to γ in the order from α to γ in rotation. Further, in the above-described embodiment, the encryption keys are allocated to the online storages α to γ in rotation such that the segment data and the encryption key that are allocated to the same online storage do not correspond to each other.

By contrast, in this embodiment, the plurality of segment data are allocated to the online storages α to γ in a random order. Further, in this embodiment, the encryption keys are allocated to the online storages α to γ in rotation in the same order as the segment data such that the segment data and the encryption key that are allocated to the same online storage do not correspond to each other.

Furthermore, a file describing a location where the subsequent segment data is present, i.e, link information (specifically, the name of the online storage and the file path on the online storage) is stored in the same folder where each segment data in the storage device 115 is stored.

Figure 12:
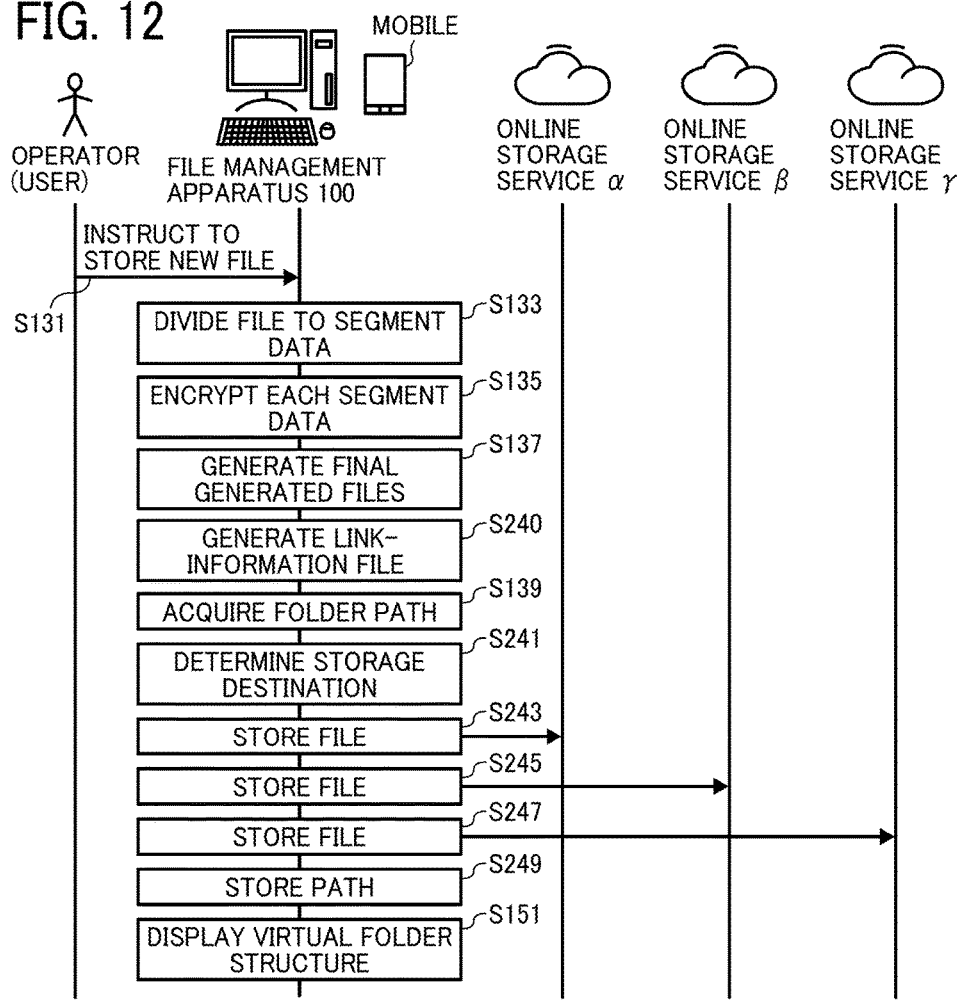
FIG. 12 is a sequence diagram illustrating an example operation of storing a new file according to another embodiment of the present invention.
Figure 13:
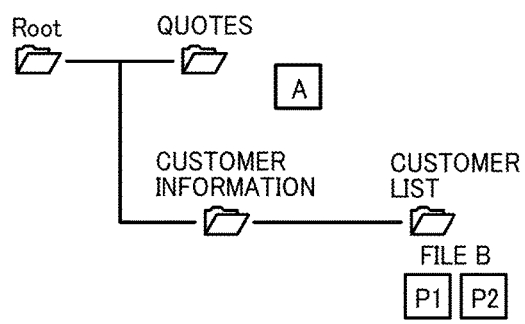
FIG. 13 illustrates an example of the virtual folder view according to another embodiment of the present invention.
Figure 14A:
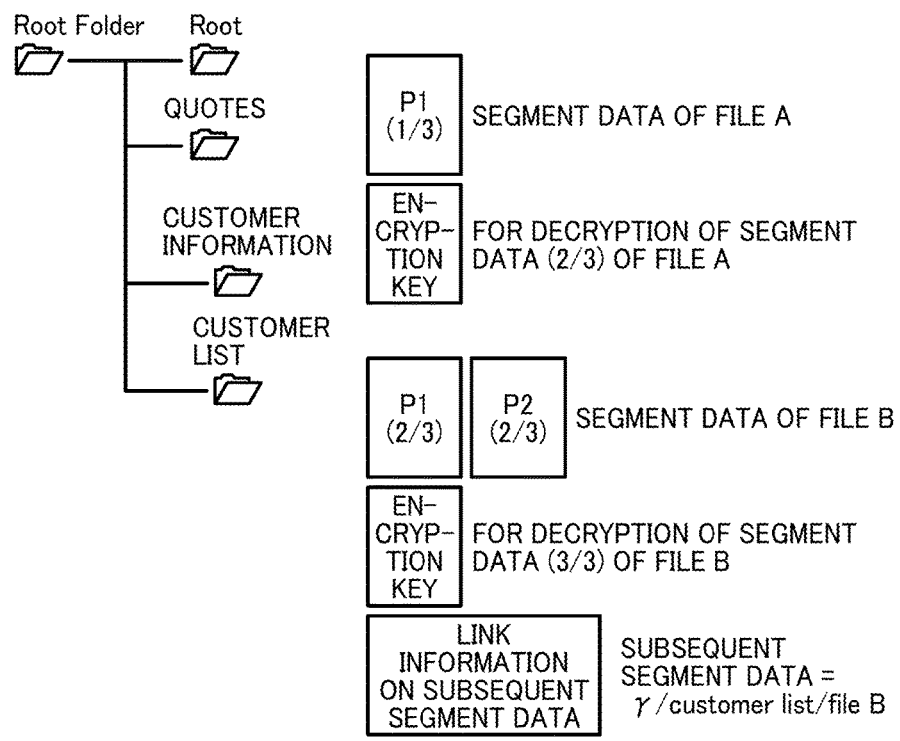
FIGS. 14A to 14C each illustrates an example of a folder structure of the online storage service according to another embodiment of the present invention.
Figure 14B:
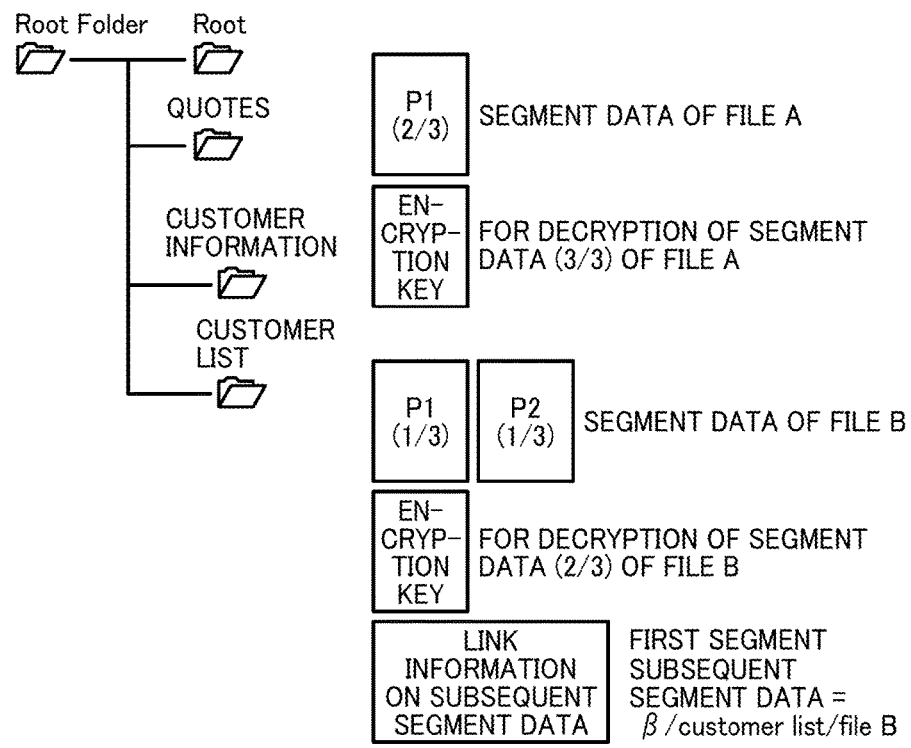
Figure 14C:
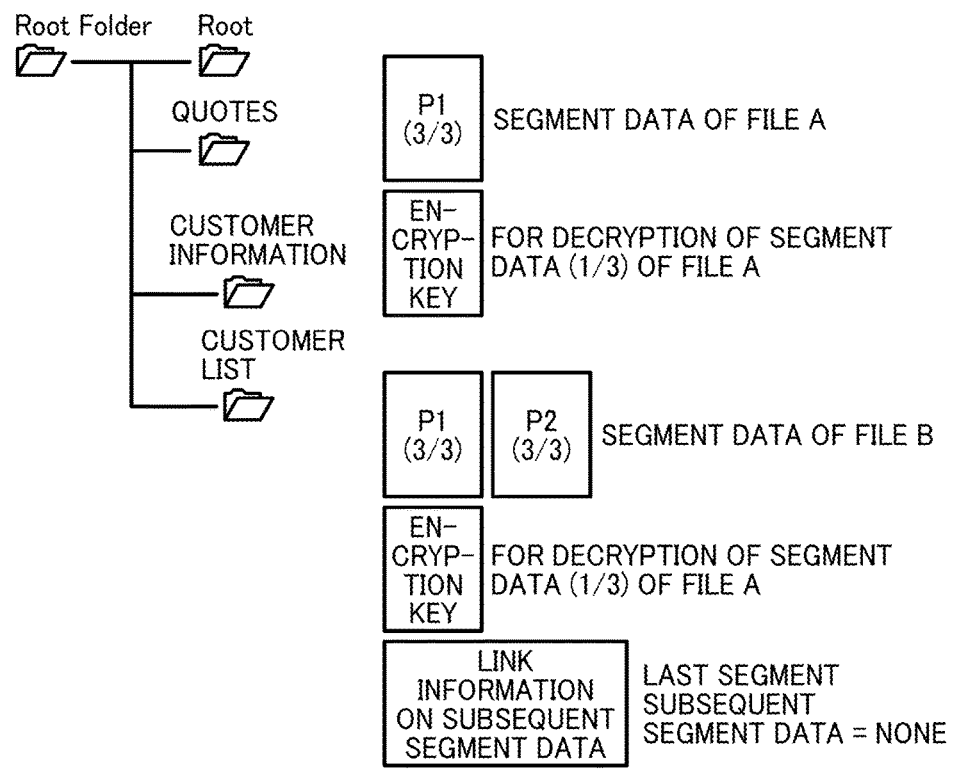

Hereinafter, a description is given of an example operation of storing a new file after the generation of the new folder. FIG. 13 illustrates an example of the virtual folder view. FIG. 12 is a sequence diagram illustrating an example operation of storing a new file after the generation of the new folder. FIGS. 14A to 14C respectively illustrate examples of a folder structure of the online storage services α to γ.

In FIG. 12, the same reference numbers are allocated to steps at which the same or substantially the same processing as described above is executed and redundant descriptions thereof are omitted below.

At S240, the folder/file management unit 135 generates a plurality of link information files (Table 7), each describing link information (file path and the like) to the subsequent data. The link information file indicates a location of a final generated file to be coupled subsequently to a certain encrypted segment data is present. Table 7 indicates the link information and what the link information mean.

TABLE 7

| Link Information | Remarks |
| --- | --- |
| α/Customer List/File B | File describing a link of 1/3 segment |
| β/Customer List/File B | File describing a link of 2/3 segment |
| Last Segment, No subsequent segment | File describing a link of 3/3 segment |

At S241, the storage destination selector 139 determines the folder in the online storages α to γ in which each of six pieces of segment data and three encryption keys is to be stored. Specifically, the storage destination selector 139 determines the folder in which each segment data is to be stored such that each of the plurality of segment data of each page is allocated to the corresponding one of the online storages α to γ in a random order. Further, the storage destination selector 139 determines the folder in which each encryption key is to be stored such that each of the encryption keys is allocated to the corresponding one of the online storages α to γ in the same order as the plurality of segment data and the segment data and the encryption key that are allocated to the same online storage do not correspond to each other.

At S243, S245, and S247, the folder/file management unit 135 stores the file describing the link information indicating a location of the segment data to be coupled subsequently to another segment data in the same folder where a corresponding segment data in the storage device 115 is stored. The link information includes the name of the online storage and the file path on the online storage.

More specifically, at S243, the folder/file management unit 135 stores, in the online storage α, the segment data P1 (2/3) and P2 (2/3), a file describing the encryption key for decrypting the segment data P1 (3/3) and P2 (3/3), and a file describing the link information (β/Customer List/File B) to the subsequent segment (3/3) as illustrated in FIG. 14A.

Further, at S245, the folder/file management unit 135 stores, in the online storage β, the segment data P1 (1/3) and P2 (1/3), a file describing the encryption key for decrypting the segment data P1 (2/3) and P2 (2/3), and a file describing the link information (α/Customer List/File B) to the subsequent segment (2/3) as illustrated in FIG. 14B.

Furthermore, at S247, the folder/file management unit 135 stores, in the online storage γ, the segment data P1 (3/3) and P2 (3/3), a file describing the encryption key for decrypting the segment data P1 (1/3) and P2 (1/3), and a file describing the link information (Last Segment) to the subsequent segment (not applicable) as illustrated in FIG. 14C.

Thus, the folder/file management unit 135, under control of the system controller 131, stores the six pieces of segment data and the three encryption keys in a predetermined folder (e.g., the "Customer List" folder in this embodiment) in each of the online storage service α to γ based on the folder/file management information stored in the second storage area 142. Note that information about the plurality of segment data is not necessary.

At S249, the folder/file management unit 135, under control of the system controller 131, adds information associating the file path of File B with the file path of the segment data of File B stored in each of the online storages α to γ to the second storage area 142. The folder/file management unit 135 also stores the order of the plurality of segment data in the second storage area 142 (Table 8). Table 8 indicates the file paths of the segment data stored by the online storage services α to γ.

TABLE 8 online storage service α/Customer List/B P1 (2/3)
online storage service β/Customer List/B P1 (1/3)
online storage service γ/Customer List/B P1 (3/3)
online storage service α/Customer List/B P2 (2/3)
online storage service β/Customer List/B P2 (1/3)
online storage service γ/Customer List/B P2 (3/3)

At S151, the system controller 131 acquires the virtual folder structure and the locations of the files including the result of storing the File B via the folder/file management unit 135 to instruct the operation display unit 132 to display the acquired contents on the display 121 as illustrated in FIG. 13.

Hereinafter, a description is given of an example operation of opening a file using the virtual folder/file view with reference to FIGS. 15 and 16. FIG. 16 illustrates an example of the virtual folder view. FIG. 15 is a sequence diagram illustrating an example operation of opening a file using the virtual folder/file view.

In FIG. 15, the same reference numbers are allocated to steps at which the same or substantially the same processing as described above is executed and redundant descriptions thereof are omitted below.

The system controller 131 generates data requests (file path requests) requesting acquisition of all segment data divided from File B and the encryption keys based on the file paths. At S271, the communication unit 134 transmits the data requests generated by the system controller 131 to the online storage services α to γ.

In response to receiving the data requests from the file management apparatus 100, the online storage services α to γ read out the segment data divided from File B, the encryption key, and the link information to the subsequent segment respectively from the online storages α to γ. Further, each of the online storage service α to γ transmits the read-out segment data, encryption key, and link information to the file management apparatus 100.

At S273, the communication unit 134 receives all segment data divided from File B and encryption keys corresponding to the file paths from the online storage services α to γ. Accordingly, the system controller 131 acquires all segment data, encryption keys, and link information to the subsequent segment onto the MEM 112.

At S275, the encryption/decryption unit 138 decrypts each segment data with the corresponding encryption key on the MEM 112 as to reproduce each original segment data.

At S277, the encryption/decryption unit 138 combines the plurality of decrypted segment data to restore File B in file format. Specifically, the encryption/decryption unit 138 combines the plurality of decrypted segment data according to the link information to the subsequent segment as the order of the plurality of segment data. Further, the encryption/decryption unit 138 stores the restored File B in the folder in the storage device 115.

Although a typical online storage is protected with a plurality of security layers, leakage of data stored in the storage sometimes occur due to an imperfection of data management by the provider or an attack by a malicious third party.

In the embodiment described above with reference to FIGS. 12 to 16, the file management apparatus 100 divides a file into the plurality of segment data and encrypts each segment data. Accordingly, even when the data is leaked form the online storage, the third party finds it difficult to restore the file content. Thus, data leakage, which is a specific problem on security, is prevented.

Thus, the file management apparatus 100 generates the link information file indicating the location of the final generated file to be coupled subsequently to a certain encrypted segment data and transmits each of the plurality of final generated files and corresponding link information files to each of the plurality of online storages α to γ to cause each online storage to store the encrypt segment data and the link information files. Accordingly, the file management apparatus 100 manages the link information files as well as the folder/management information associating the folder path and the file path of each of the plurality of final generated files with the virtual folder path and the virtual file path that are set for managing each folder and file. Thus, the user is able to locate the file by intuition even when the user uses the online storage directly not through the file management apparatus 100.

Further, the file management apparatus 100 transmits each of the plurality of final generated files and the link information file corresponding the final generated file being transmitted, each link information file including the online storage name and the file path on the online storage, to the corresponding one of the online storages α to γ to cause each online storage to store the link information file and the final generated file. Accordingly, the file management apparatus 100 manages the link information files as well as the folder/management information associating the folder path and the file path of each of the plurality of final generated files with the virtual folder path and the virtual file path that are set for managing each folder and file. Thus, the user is able to locate the file by intuition even when the user uses the online storage directly not through the file management apparatus 100.

Hereinafter, a description is given of operations performed by the file management apparatus 100 as the information processing apparatus according to still another embodiment of the present invention.

In the embodiment described above with reference to FIGS. 1 to 11, the storage destination selector 139 determines in which of the online storages α to γ each segment data is to be stored such that the plurality of segment data of each page are allocated respectively to the online storages α to γ in the order from α to γ.

By contrast, in this embodiment, the storage destination selector 139 determines in which of the online storages α to γ each segment data is to be stored depending on a volume of available memory space remaining in each of the online storages α to γ. The communication unit 134 communicates data with each of the online storage services α to γ to acquire information indicating the available memory space. The storage destination selector 139 determines whether the available memory space remaining in each of the online storages α to γ is less than or equal to a reference value to determine to which of the online storages α to γ a limit on the amount of data to be stored is to be set.

Figure 18:
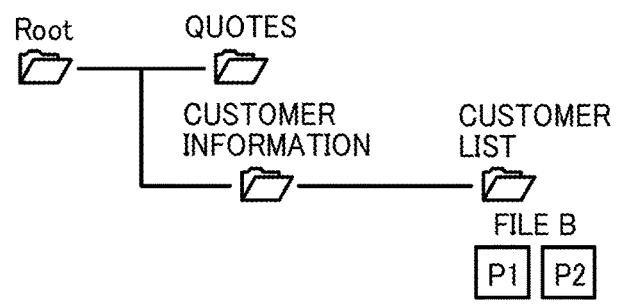
FIG. 18 illustrates an example of the virtual folder view according to still another embodiment of the present invention.
Figure 19A:
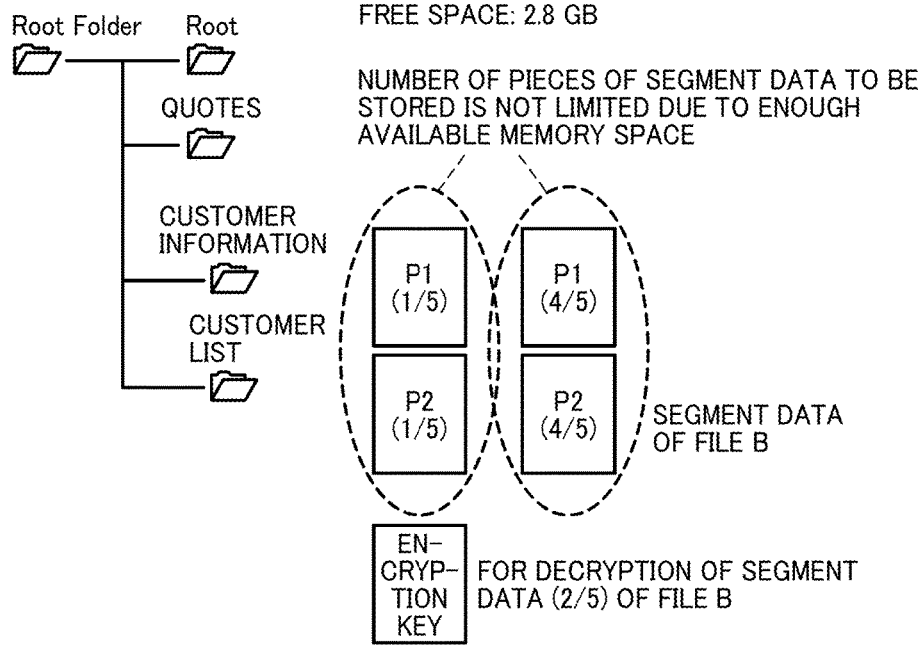
FIGS. 19A to 19C each illustrates an example of a folder structure of the online storage service according to still another embodiment of the present invention.
Figure 19B:
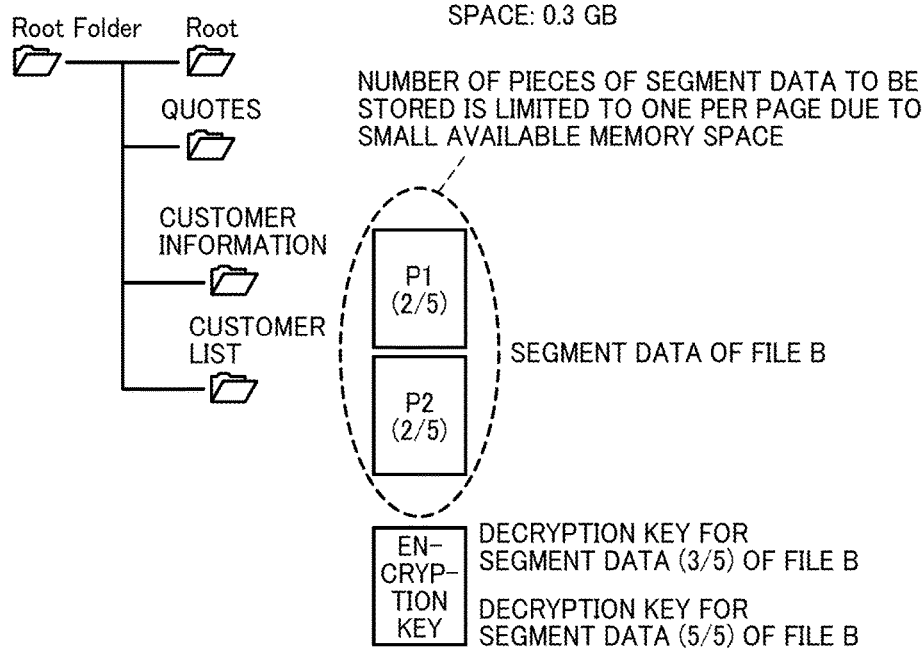
Figure 19C:
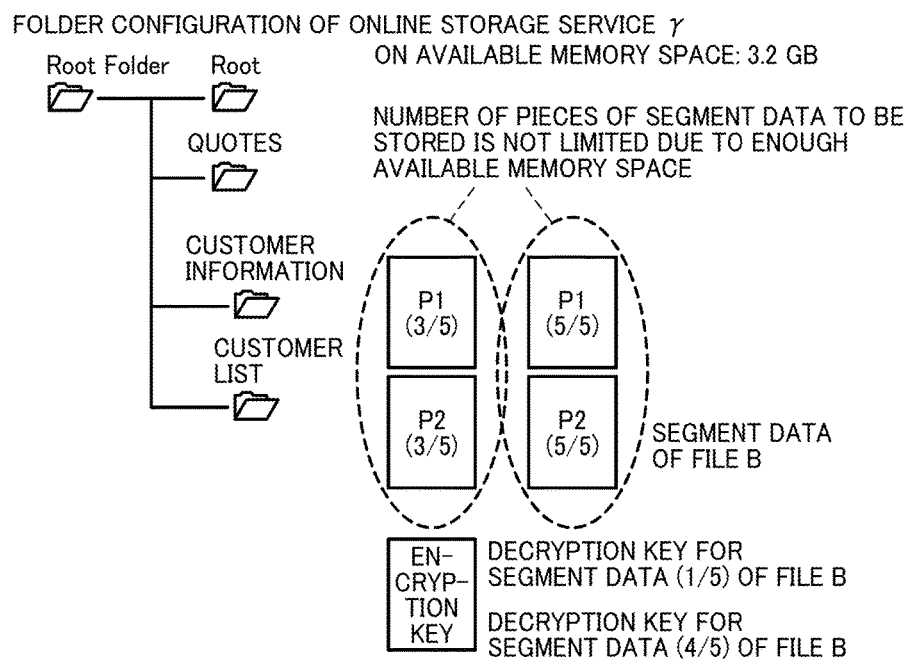

Hereinafter, a description is given of an example operation of storing a new file after the generation of the new folder with reference to FIGS. 17 and 18. FIG. 17 is a sequence diagram illustrating an example operation of storing a new file after the generation of the new folder. FIG. 18 illustrates an example of the virtual folder view. FIGS. 19A to 19C respectively illustrate examples of a folder structure of the online storage services α to γ.

At S301, the file management apparatus 100 receives, from the user, an instruction for storing a new file "File B" in the folder "Customer List" displayed on the virtual folder view displayed by the operation display unit 132.

At S303, the system controller 131 instructs the communication unit 134 to send a request to each of the online storage services α to γ for information indicating the available memory space associated with the user account, to which space the user can add data.

Each of the online storage services α to γ acquires the information indicating the available memory space associated with the user account and transmits acquired information indicating the available memory space to the file management apparatus 100.

At S305, the system controller 131 receives the information indicating the available memory space associated with the user account from each of the online storage services α to γ via the communication unit 134. Further, the system controller 131 stores the received information indicating the available memory space in the fifth storage area 145. Table 9 indicates the available memory space remaining in each of the online storages α to γ associated a certain user account.

TABLE 9

| online storage service α | 2.8 GB |
| online storage service β | 0.3 GB |
| online storage service γ | 3.2 GB |

At S307, the storage destination selector 139 acquires the reference value from the fifth storage area 145. The storage destination selector 139 determines, for each of the online storages α to γ, whether the available memory space is small based on the reference value.

The reference value stored in the fifth storage area 145 is a fixed value.

Alternatively, the user sets the reference value to a desired value. In this case, the fifth storage area 145 stores the reference value set by the user. In this embodiment, a fixed value of 0.5 GB is stored as the reference value in the fifth storage area 145.

Different reference values may be set respectively for the plurality of online storages α to γ.

At S309, the storage destination selector 139 determines whether the available memory space indicated by the information acquired from each of the online storages α to γ is less than or equal to a reference value to determine to which of the online storages α to γ a limit on the amount of data to be stored is to be set. In this embodiment, the available memory space remaining in the online storage service β is 0.3 GB, which is less than 0.5 GB as the reference value. Accordingly, the storage destination selector 139 determines that the amount of data to be stored in the online storage β should be limited.

At S311, the data divider 137 the data divider 137 determines the number of segment data into which each page is to be divided. The data divider 137 may determine that each page is to be divided into a fixed number of segment data. In this case, the fixed numerical value is stored in the fifth storage area 145. Alternatively, the user sets the number of segment data into which each page is to be divided to a desired value. In this case, the fifth storage area 145 stores the numerical value set by the user. In this embodiment, the data divider 137 determines that each page is to be divided into five pieces of segment data.

As the File B is consisted of two pages (P1, P2), at S313, the data divider 137 divides each page to five pieces of segment data as illustrated in Table 10 below. As illustrated in Table 10, P1 is divided into first to fifth segment data, which are respectively represented by P1 (1/5), P1 (2/5), P1 (3/5), P1 (4/5), and P1 (5/5). In addition, P2 is divided into first to fifth segment data, which are respectively represented by P2 (1/5), P2 (2/5), P2 (3/5), P2 (4/5), and P2 (5/5).

TABLE 10

| Before Division | After Division | | | | |
|---|---|---|---|---|---|
| P1 | P1 (1/5) | P1 (2/5) | P1 (3/5) | P1 (4/5) | P1 (5/5) |
| P2 | P2 (1/5) | P2 (2/5) | P2 (3/5) | P2 (4/5) | P2 (5/5) |

File B is present in the folder "Customer List" on the virtual folder structure. Accordingly, at S315, the folder/file management unit 135 checks the folder/file management information stored in the second storage area 142 to acquire the folder path of each of the online storage services α to γ associated with the virtual folder "Customer List"

The encryption/decryption unit 138 generates a plurality of encryption keys such that the number of encryption keys is equal to the number of pieces of segment data divided from each page. In this embodiment, the encryption/decryption unit 138 generates five encryption keys as each page is divided into five pieces of segment data. At S317, the encryption/decryption unit 138 encrypts each segment data using each encryption key.

At S319, the storage destination selector 139 determines the folder in the online storages α to γ in which each of ten pieces of segment data and five encryption keys is to be stored. Specifically, the storage destination selector 139 determines the folder in which each segment data is to be stored such that each of the plurality of segment data of each page is allocated to the corresponding one of the online storages α to γ in the order from α to γ in rotation. In addition, the storage destination selector 139 determines that one piece of segment data per page is to be stored at maximum in the online storage β based on the determination at S309 that the amount of data to be stored in the online storage β should be limited.

FIG. 19A to 19C illustrate the allocation of the plurality of segment data in the online storage services α to γ.

At S321α to S321γ, the folder/file management unit 135, under control of the system controller 131, stores the ten pieces of segment data and the five encryption keys in a predetermined folder in each of the online storage service α to γ based on the folder/file management information stored in the second storage area 142.

Specifically, at S321α, the folder/file management unit 135 stores, in the online storage α, the segment data P1 (1/5), P1 (4/5), P2 (1/5), and P2 (4/5) and a file describing the encryption key for decrypting the segment data P1 (2/5) and P2 (2/5) as illustrated in FIG. 19A.

Further, at S321β, the folder/file management unit 135 stores, in the online storage β, the segment data P1 (2/5) and P2 (2/5) and a file describing the encryption key for decrypting the segment data P1 (3/5) and P2 (3/5) and the encryption key for decrypting the segment data P1 (5/5) and P2 (5/5) as illustrated in FIG. 19B. Note that one piece of segment data per page is stored at maximum in the online storage β.

Furthermore, at S321γ, the folder/file management unit 135 stores, in the online storage γ, the segment data P1 (3/5), P1 (5/5), P2 (3/5), and P2 (5/5) and a file describing the encryption key for decrypting the segment data P1 (1/5) and P2 (1/5) and the encryption key for decrypting the segment data P1 (4/5) and P2 (4/5) as illustrated in FIG. 19C.

At S323, the folder/file management unit 135, under control of the system controller 131, adds information associating the file path of File B with the file path of the segment data of File B stored in each of the online storages α to γ to the second storage area 142. Table 11 shows the relation between the virtual path and the actual data path. The actual data path includes the order of the plurality of segment data such as 1/5, 2/5 and 3/5.

The initial setting screen 151 displays setting items to be configured and corresponding set values.

The "Number of Segments (Number of Segments to Which Each Page is Divided" indicates the setting for the number of segment data into which each page is to be divided. The system controller 131 acquires the value that is set on the initial setting screen 151 for the number of segment data into which each page is to be divided and stores the set value in the fourth storage area 144.

The "Available Memory Space Remaining in Online Storage" indicates the reference value for the available memory space in the online storages α to γ based on which the file management apparatus determines to which of the online storages α to γ a limit on the amount of data (the number of pieces of segment data) to be stored is to be set. The system controller 131 acquires the reference value that is set on the initial setting screen 151 and stores the set reference value in the fifth storage area 145.

The file management apparatus 100 determines the number of segment data into which each page is to be divided based on the value set on the initial setting screen 151. Further, the file management apparatus 100 determines to which of the online storages α to γ a limit is to be placed on the number of the pieces of segment data to be stored based on the reference value set on the initial setting screen 151.

In recent years, workers at a small-scaled office such as a small office/home office (SOHO) share a personal computer. At this type of office, they use an online storage service that is provided for free. On the other hand, in some online

TABLE 11

| Virtual path | Actual data path |
| --- | --- |
| Root/Quotes | online storage service α/Quotes |
| Root/Quotes | online storage service β/Quotes |
| Root/Quotes | online storage service γ/Quotes |
| Root/Customer Information/Customer List | online storage service α/Customer List |
| Root/Customer Information/Customer List | online storage service β/Customer List |
| Root/Customer Information/Customer List | online storage service γ/Customer List |
| Root/Customer Information/Customer List/B | online storage service α/Customer List/B P1 (1/5) |
| Root/Customer Information/Customer List/B | online storage service β/Customer List/B P1 (2/5) |
| Root/Customer Information/Customer List/B | online storage service γ/Customer List/B P1 (3/5) |
| Root/Customer Information/Customer List/B | online storage service α/Customer List/B P1 (4/5) |
| Root/Customer Information/Customer List/B | online storage service β/Customer List/B P1 (5/5) |
| Root/Customer Information/Customer List/B | online storage service α/Customer List/B P2 (1/5) |
| Root/Customer Information/Customer List/B | online storage service β/Customer List/B P2 (2/5) |
| Root/Customer Information/Customer List/B | online storage service γ/Customer List/B P2 (3/5) |
| Root/Customer Information/Customer List/B | online storage service α/Customer List/B P2 (4/5) |
| Root/Customer Information/Customer List/B | online storage service β/Customer List/B P2 (5/5) |

At S325, the system controller 131 acquires the virtual folder structure and the locations of the files including the result of storing the File B to via the folder/file management unit 135 to instruct the operation display unit 132 to display the acquired contents on the display 121 as illustrated in FIG. 18.

Figure 20:
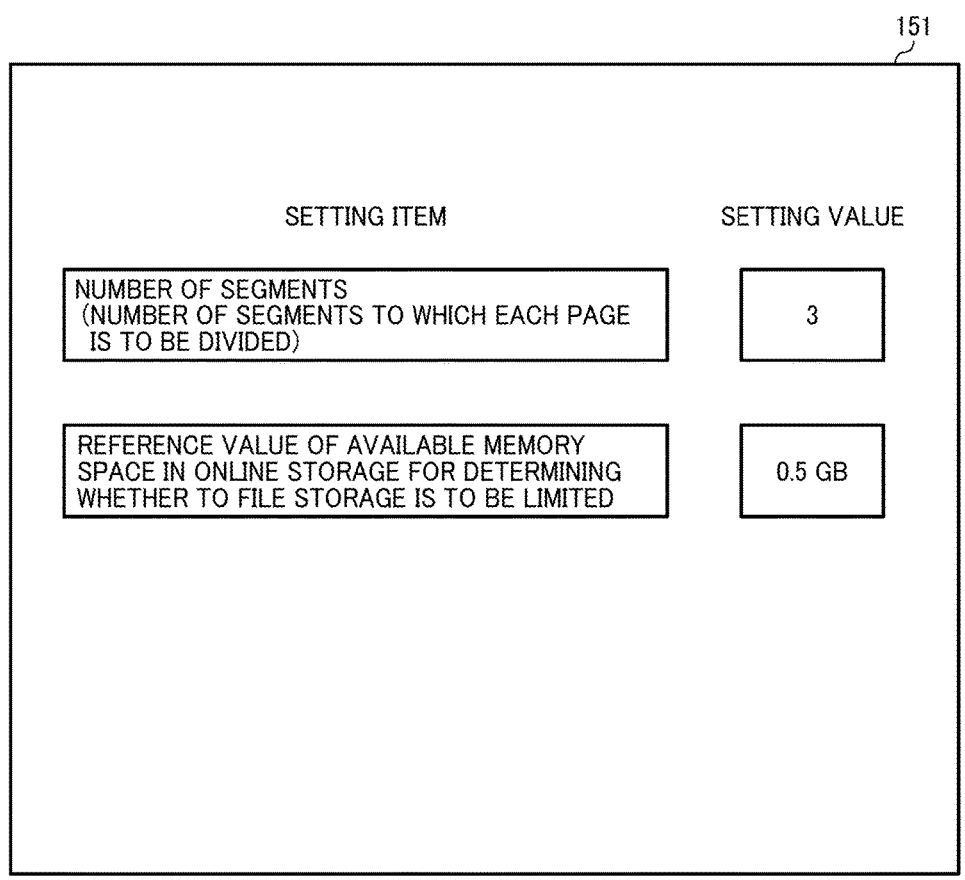
FIG. 20 is a schematic diagram illustrating an initial setting screen of the file management apparatus according to an embodiment of the present invention.

FIG. 20 is a schematic diagram illustrating an initial setting screen 151 of the file management apparatus 100. The user sets a desired value relating to file management in the file management application of the file management apparatus 100.

storage services such as Dropbox (registered trademark) and Google Drive (registered trademark), a disc capacity a user can consume for free is limited. When the user has a large volume of files to be stored, the user has to use different storage services to which the files are allocated.

In this case, the user wants to make an effective use of the limited resources of the online storage services that the user can use for free or at cost.

The file management apparatus 100 according to this embodiment allocates each of the plurality of segment data to the corresponding one of the online storages α to γ depending on the information indicating available memory space remaining in each of the online storages α to γ.

Thus, the file management apparatus 100 determines a transmission destination depending on the available memory space remaining in each of the online storages α to γ to cause the online storage as the transmission destination to store the final generated file. Accordingly, the file management apparatus 100 manages the folder/file management information associating the folder path and the file path of each of the plurality of final generated files with the virtual folder path and the virtual file path that are set for managing each folder and file. Thus, the user is able to locate the file by intuition even when the user uses the online storage directly not through the file management apparatus 100.

Further, the file management apparatus 100 divides the file (page) into the plurality of segment data with the number of segment data being set by the user (FIG. 20). Accordingly, the file management apparatus 100 stores a plurality of final generated files in different online storages with the number of the final generated files being equal to the number of the online storages. Accordingly, the file management apparatus 100 manages the folder/management information associating the folder path and the file path of each of the plurality of final generated files with the virtual folder path and the virtual file path that are set for managing each folder and file. Thus, the user is able to locate the file by intuition even when the user uses the online storage directly not through the file management apparatus 100.

Furthermore, the reference value for the available memory space in each online storage is set (FIG. 20). The file management apparatus 100 determines to which of the online storages α to γ the final generated file is to be transmitted based on whether the available memory space in each online storage (Table 9) is less than or equal to the reference value to cause the online storages to store the final generated file based on the determination. Accordingly, the file management apparatus 100 manages the folder/file management information associating the folder path and the file path of each of the plurality of final generated files with the virtual folder path and the virtual file path that are set for managing each folder and file. Thus, the user is able to locate the file by intuition even when the user uses the online storage directly not through the file management apparatus 100.

The file management apparatus 100 (information processing apparatus) according to an aspect of the present invention is connected to the plurality of online storages α to γ via the communication network 10. The file management apparatus 100 includes the data divider 137 (a data dividing unit) to divide a file to a plurality of pieces of segment data, the encryption/decryption unit 138 (an encryption unit) to encrypt each of the plurality of segment data with a encryption key, the folder/file management unit 135 (a final-generated file generation unit) to generate a plurality of final generated files, each including the encryption key and at least one piece of the plurality of segment data encrypted with the encryption key, the communication unit 134 to transmit each one of the plurality of final generated files to a corresponding one of the plurality of online storages α to γ, and the folder/file management unit 135 (a folder/file management unit) to manage the folder/file management information associating the folder path of each of the folders stored in the online storages with the virtual folder path, and associating a file path of each of the final generated files stored in the online storages with the virtual file path, the virtual file path and the virtual folder path being set for managing the folder and the file.

In the present disclosure, the path means a character string that indicates a location where a file or a folder is present in an external storage.

The online storage service is a service that offers a disc space for storing files or data over the Internet.

According to this aspect, the data divider 137 illustrated in FIG. 3 divides a file into the plurality of segment data. The encryption/decryption unit 138 encrypts each segment data with the encryption key. The folder/file management unit 135 generates a plurality of final generated files each including the encryption key and at least one of the segment data encrypted with the encryption key. The communication unit 134 transmits each one of the plurality of final generated files to the corresponding one of the online storages α to γ. The folder/file management unit 135 manages the folder/file management information. The folder/file management information associates a folder path of each of the folders stored in the online storages with a virtual folder path, and associates a file path of each of the final generated files stored in the online storages with a virtual file path, the virtual file path and the virtual folder path being set for managing the folder and the file.

Thus, the file management apparatus 100 manages the folder/file management information that associates the folder path of each of the folders stored in the online storages α to γ with the virtual folder path, and associates the file path of each of the plurality of final generated files each containing the encrypted segment data stored in the online storages α to γ with the virtual file path, with the virtual file path and the virtual folder being set for managing the folder and the file. Thus, as illustrated in FIG. 7, the user is able to locate the file by intuition even when the user uses the online storage directly not through the file management apparatus 100.

The data divider 137 according to another aspect of the present invention, the number of pieces of segment data that is divided form the file is equal to the number of the plurality of online storages connected to the file management apparatus 100.

According to this aspect, the data divider 137 divides the file into the plurality of pieces of segment data such that the number of pieces of segment data is equal to the number of the plurality of online storages connected to the file management apparatus 100. The communication unit 134 transmits each one of the plurality of final generated files to the corresponding one of the plurality of online storages.

Thus, the file management apparatus 100 stores each of the plurality of final generated files in the corresponding one of the online storages with the number of the final generated files being equal to the number of the online storages. Accordingly, the file management apparatus 100 manages the folder/management information associating the folder path and the file path of each of the plurality of final generated file respectively with the virtual folder path and the virtual file path that are set for managing each folder and file. Thus, the user is able to locate the file by intuition even when the user uses the online storage directly not through the file management apparatus 100.

The file management apparatus 100 according to still another aspect includes the communication unit 134 (an acquisition unit) to acquire information indicating available memory space remaining in each of the online storages, and the storage destination selector 139 (a destination determination unit) to determine to which of the online storages each segment data is to be transmitted based on the information indicating the available memory space in each of the online storages. The communication unit 134 transmits each of the plurality of segment data to the corresponding one of the online storages based on the determination by the storage destination selector 139.

According to this aspect, the communication unit 134 acquires information indicating the available memory space remaining in each of the online storages as illustrated in Table 9. The storage destination selector 139 determines to which of the online storages each segment data is to be transmitted based on the information indicating the available memory space in each of the online storages. The communication unit 134 transmits each of the plurality of segment data to the corresponding one of the online storages based on the determination by the storage destination selector 139.

Thus, the file management apparatus 100 determines to which of the online storages the segment data is to be transmitted based on the information indicating the available memory space in each of the online storages. Accordingly, the file management apparatus 100 manages the folder/management information associating the folder path and the file path of each of the plurality of final generated file respectively with the virtual folder path and the virtual file path that are set for managing the folder and the file. Thus, the user is able to locate the file by intuition even when the user uses the online storage directly not through the file management apparatus 100.

The data divider 137 according to still another aspect of the present invention divides the file into the plurality of pieces of segment data with the number of pieces of segment data being set by a user.

The data divider 137 according this aspect divides the file into the plurality of pieces of segment data with the number of pieces of segment data being set by a user.

Thus, the file management apparatus 100 divides the file (page) into the plurality of segment data with the number of segment data being set by the user (FIG. 20). Accordingly, the file management apparatus 100 manages the folder/management information associating the folder path and the file path of each of the plurality of final generated files respectively with the virtual folder path and the virtual file path that are set for managing each folder and file. Thus, the user is able to locate the file by intuition even when the user uses the online storage directly not through the file management apparatus 100.

The storage destination selector 139 according to still another aspect of the present invention sets a set a reference value for determining at least one of the plurality of online storages to be set with a limit on the number of pieces of segment data to be stored.

The storage destination selector 139 according to this aspect sets a reference value for determining to which of the online storages α to γ a limit on the number of pieces of segment data to be stored is to be set.

Thus, the reference value for the available memory space remaining in each online storage is set. The file management apparatus 100 determines to which of the online storages α to γ the final generated file is to be transmitted based on whether the available memory space in each online storage is less than or equal to the reference value to cause the online storages to store the final generated file based on the determination. Accordingly, the file management apparatus 100 manages the folder/file management information associating the folder path and the file path of each of the plurality of final generated files respectively with the virtual folder path and the virtual file path that are set for managing each folder and file. Thus, the user is able to locate the file by intuition even when the user uses the online storage directly not through the file management apparatus 100.

The encryption/decryption unit 138 according to still another aspect of the present invention encrypts the plurality of segment data respectively with different encryption keys. The folder/file management unit 135 generates the plurality of final generated files, each including one of the encryption keys and at least one piece of the plurality of segment data encrypted with another one of the encryption keys.

According to this aspect, the encryption/decryption unit 138 encrypts the plurality of segment data respectively with different encryption keys. The folder/file management unit 135 generates the plurality of final generated files, each including one of the encryption keys and at least one piece of the plurality of segment data encrypted with another one of the encryption keys.

Thus, the file management apparatus 100 according to this aspect encrypts the plurality of segment data with different encryption keys, generates the plurality of final generated files, each including one of the encryption keys and at least one of the plurality of segment data that is encrypted with the encryption key other than the included encryption key, and stores the plurality of final generated files respectively in the online storages. Accordingly, the file management apparatus 100 manages the folder/management information associating the folder path and the file path of each of the plurality of final generated files respectively with the virtual folder path and the virtual file path that are set for managing the folder and the file. Thus, the user is able to locate the file by intuition even when the user uses the online storage directly not through the file management apparatus 100.

The file management apparatus 100 according to still another aspect of the present invention includes the folder/file management unit 135 (a link information file generation unit) to generate the link information file indicating a location of the final generated file to be coupled subsequently to a certain encrypted segment data. The communication unit 134 transmits each of the plurality of final generated files and the link information files corresponding the final generated file being transmitted, to the corresponding one of the plurality of online storages α to γ.

According to this aspect, the folder/file management unit 135 generates the link information file indicating a location of the final generated file to be coupled subsequently to a certain encrypted segment data. As illustrated in FIG. 14, the communication unit 134 transmits each of the plurality of final generated files and the link information file corresponding to the final generated file being transmitted to the corresponding one of the plurality of online storages α to γ.

Thus, the file management apparatus 100 according to this aspect generates the link information file indicating the location of the final generated file to be coupled subsequently to a certain encrypted segment data is and transmits each of the plurality of final generated files and the link information file corresponding to the final generated file being transmitted to the corresponding one of the plurality of online storages to cause each online storage to store the final generated file and the link information file. Accordingly, the file management apparatus 100 manages the link information files as well as the folder/management information associating the folder path and the file path of each of the plurality of final generated files respectively with the virtual folder path and the virtual file path that are set for managing the folder and the file. Thus, the user is able to locate the file by intuition even when the user uses the online storage directly not through the file management apparatus 100.

The link information file according to still another embodiment of the present invention includes a name of the online storage and the file path on the online storage.

According to this embodiment, the link information includes of a name of the online storage and the file path on the online storage.

Thus, the file management apparatus 100 according to this aspect transmits the plurality of link information files, each including the online storage name and the file path on the online storage, and the plurality of final generated files to the plurality of online storages to cause each online storage to store the link information file and the final generated file. Accordingly, the file management apparatus 100 manages the link information files as well as the folder/management information associating the folder path and the file path of each of the plurality of final generated files respectively with the virtual folder path and the virtual file path that are set for managing each folder and file. Thus, the user is able to locate the file by intuition even when the user uses the online storage directly not through the file management apparatus 100.

The file management system 1 (information processing system) according to an aspect of the present invention includes a computer-readable program causing the computer to perform a method including divide a file to a plurality of pieces of segment data (S133), encrypt each of the plurality of segment data with an encryption key (S135), generating a plurality of final generated files, each including the encryption key and at least one piece of the plurality of segment data encrypted with the encryption key (S137), transmitting each of the plurality of final generated file to a corresponding one of the plurality of online storages α to γ ((S143, S145, and S147)), and managing the folder/file management information associating the folder path of each of the folders stored in the online storages with the virtual folder path, and associating a file path of each of the final generated files stored in the online storages with the virtual file path, the virtual file path and the virtual folder path being set for managing the folder and the file (S149).

According to this aspect, the operational effect similar to that of the above aspect is produced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing apparatus connected to a plurality of online storages through a network, the apparatus comprising:
   circuitry configured to,
      divide a file into a plurality of pieces of segment data such that a number of the plurality of pieces of segment data is equal to a number of the plurality of online storages connected to the information processing apparatus,
      encrypt each of the plurality of segment data with an encryption key,
      generate a plurality of final generated files, each including the encryption key and at least one piece of the plurality of segment data encrypted with the encryption key, and
      manage folder and file management information by,
         setting an association between a folder path of each of the folders stored in the online storages with a virtual folder path, and
         setting an association between a file path of each of the final generated files stored in the online storages with a virtual file path; and
   a transmitter configured to transmit each one of the plurality of final generated files to a corresponding one of the plurality of online storages to cause each final generated file be stored in a folder in the corresponding one of the plurality of online storages.

2. The information processing apparatus of claim 1, wherein
   the circuitry is further configured to,
      acquire information indicating an available memory space in each of the online storages, and
      determine to which of the online storages each segment data is to be transmitted based on the information indicating the available memory space in each of the online storages, and
   the transmitter is configured to transmit each one of the plurality of final generated files to the corresponding one of the plurality of online storages based on the determination.

3. The information processing apparatus of claim 2, wherein the circuitry is further configured to set a reference value for determining to which of the plurality of online storages a limit on the number of pieces of segment data to be stored is to be set.

4. The information processing apparatus of claim 1, wherein the circuitry divides the file into the plurality of pieces of segment data with the number of pieces of segment data being set by a user.

5. The information processing apparatus of claim 1, wherein the encryption key includes a plurality of different encryption keys, and the circuitry is configured to,
   encrypt the plurality of segment data respectively with the different encryption keys, and
   generate the plurality of final generated files, each including one of the encryption keys and at least one piece of the plurality of segment data encrypted with another one of the encryption keys.

6. The information processing apparatus of claim 5, wherein
   the circuitry is further configured to generate a plurality of link information files each indicating a location of the final generated file to be coupled subsequently to a certain encrypted segment data, and
   the transmitter is configured to transmit each of the plurality of final generated files and the link information file corresponding to the final generated file being transmitted, to the corresponding one of the plurality of online storages.

7. The information processing apparatus of claim 6, wherein the link information file includes a name of the online storage and the file path on the online storage.

8. The information processing apparatus of claim 1, wherein the circuitry is further configured to decrypt each of the plurality of segment data encrypted with the encryption key to reproduce the original segment data.

9. An information processing method performed by an information processing apparatus, the information processing apparatus connected to a plurality of online storages through a network, the method comprising:
- dividing a file into a plurality of pieces of segment data such that a number of the plurality of pieces of segment data is equal to a number of the plurality of online storages connected to the information processing apparatus;
- encrypting each of the plurality of segment data with an encryption key;
- generating a plurality of final generated files, each including the encryption key and at least one piece of the plurality of segment data encrypted with the encryption key;
- managing folder and file management information by,
  - setting an association between a folder path of each of the folders stored in the online storages with a virtual folder path, and
  - setting an association between a file path of each of the final generated files stored in the online storages with a virtual file path; and
- transmitting each one of the plurality of final generated files to a corresponding one of the plurality of online storages to cause each final generated file be stored in a folder in the corresponding one of the plurality of online storages.

10. A non-transitory computer-readable medium storing a computer-executable program causing an information processing apparatus connected to a plurality of online storages through a network to perform a method comprising:
- dividing a file into a plurality of pieces of segment data such that a number of the plurality of pieces of segment data is equal to a number of the plurality of online storages connected to the information processing apparatus;
- encrypting each of the plurality of segment data with an encryption key;
- generating a plurality of final generated files, each including the encryption key and at least one piece of the plurality of segment data encrypted with the encryption key;
- managing folder and file management information by,
  - setting an association between a folder path of each of the folders stored in the online storages with a virtual folder path, and
  - setting an association between a file path of each of the final generated files stored in the online storages with a virtual file path; and
- transmitting each one of the plurality of final generated files to a corresponding one of the plurality of online storages to cause each final generated file be stored in a folder in the corresponding one of the plurality of online storages.

* * * * *